(12) United States Patent
Riemer et al.

(10) Patent No.: US 8,270,933 B2
(45) Date of Patent: Sep. 18, 2012

(54) SAFETY FEATURES FOR PORTABLE ELECTRONIC DEVICE

(75) Inventors: Michael S. Riemer, McLean, VA (US); Melvin A. Barbera, Hamilton, OH (US)

(73) Assignee: Zoomsafer, Inc., Herndon, VA (US)

( * ) Notice: Subject to any disclaimer, the term of this patent is extended or adjusted under 35 U.S.C. 154(b) by 371 days.

(21) Appl. No.: 12/755,377

(22) Filed: Apr. 6, 2010

(65) Prior Publication Data

US 2010/0216509 A1  Aug. 26, 2010

Related U.S. Application Data

(63) Continuation-in-part of application No. 12/394,413, filed on Feb. 27, 2009, and a continuation of application No. 11/285,556, filed on Nov. 22, 2005, now Pat. No. 7,505,784.

(60) Provisional application No. 61/166,860, filed on Apr. 6, 2009, provisional application No. 60/720,528, filed on Sep. 26, 2005.

(51) Int. Cl.
  *H04B 1/06* (2006.01)
  *H04M 1/00* (2006.01)
(52) U.S. Cl. .............. 455/345; 455/569.2; 455/575.9
(58) Field of Classification Search .............. 455/344, 455/345, 550.1, 556.1, 557, 565, 567, 568.1, 455/569.1, 569.2, 575.1, 575.9; 340/441, 340/525, 575, 576, 901
See application file for complete search history.

(56) References Cited

U.S. PATENT DOCUMENTS

| | | |
|---|---|---|
| 4,989,230 A | 1/1991 | Gillig |
| 5,301,227 A | 4/1994 | Kamei et al. |
| 5,924,042 A * | 7/1999 | Sakamoto et al. ............ 455/458 |
| 6,064,749 A | 5/2000 | Hirota et al. |
| 6,108,532 A | 8/2000 | Matsuda et al. |
| 6,188,315 B1 | 2/2001 | Herbert et al. |
| 6,263,190 B1 | 7/2001 | Mamori et al. |
| 6,266,589 B1 | 7/2001 | Boies et al. |
| 6,311,078 B1 | 10/2001 | Hardouin |
| 6,353,778 B1 | 3/2002 | Brown |

(Continued)

FOREIGN PATENT DOCUMENTS

EP  0660626 A2  6/1995

(Continued)

OTHER PUBLICATIONS (Author Unknown); "Mitsubishi Launches Compact, Multi-Function Digital Phone"; Dempa Shimbun; Jul. 10, 1997; p. 5; published in Japan [translated excerpt].

(Continued)

*Primary Examiner* — Quochien B Vuong
(74) *Attorney, Agent, or Firm* — Woodcock Washburn LLP

(57) ABSTRACT

A portable device includes a safety feature that prevents some forms of use when the device is moving. The device may detect its speed or movement, compare that to a threshold, and provide a response or blocking function upon exceeding that threshold. The device may be a cell phone configured to disable transmission and reception of voice/text, conceal its display screen, and disable incorporated features and functions, if the cell phone is moving faster than walking speed or the movement is uncharacteristic of walking. The blocking function may be partially overridden based on a safety policy, which can be managed and customized. The introduction of hands-free devices may serve to override a blocking function and enable other functions.

11 Claims, 9 Drawing Sheets

U.S. PATENT DOCUMENTS

| | | |
|---|---|---|
| 6,421,538 B1 | 7/2002 | Byrne |
| 6,424,888 B1 | 7/2002 | Sone et al. |
| 6,496,703 B1 | 12/2002 | Da Silva |
| 6,496,709 B2 | 12/2002 | Murray |
| 6,502,022 B1 | 12/2002 | Chastain et al. |
| 6,522,312 B2 | 2/2003 | Ohshima et al. |
| 6,556,185 B2 | 4/2003 | Rekimoto |
| 6,600,975 B2 * | 7/2003 | Moriguchi et al. ...... 342/357.57 |
| 6,647,328 B2 | 11/2003 | Walker |
| 6,687,497 B1 | 2/2004 | Parvulescu et al. |
| 6,690,292 B1 | 2/2004 | Meadows |
| 6,690,940 B1 | 2/2004 | Brown et al. |
| 6,690,956 B2 | 2/2004 | Chua et al. |
| 6,731,925 B2 | 5/2004 | Naboulsi |
| 6,771,946 B1 | 8/2004 | Oyaski |
| 6,845,316 B2 | 1/2005 | Yates |
| 6,961,561 B2 | 1/2005 | Himmel et al. |
| 6,901,264 B2 | 5/2005 | Myr |
| 6,937,868 B2 | 8/2005 | Himmel |
| 6,973,333 B1 | 12/2005 | O'Neil |
| 7,082,106 B2 | 7/2006 | Sharma |
| 7,142,879 B2 * | 11/2006 | Watanabe et al. ............. 455/458 |
| 7,181,229 B2 | 2/2007 | Singh et al. |
| 7,194,273 B2 | 3/2007 | Vaudreuil |
| 7,245,905 B2 | 7/2007 | Kamdar et al. |
| 7,272,403 B2 | 9/2007 | Creamer et al. |
| 7,343,148 B1 | 3/2008 | O'Neil |
| 7,362,263 B2 | 4/2008 | McBurney et al. |
| 2002/0198005 A1 | 12/2002 | Hilton |
| 2004/0121783 A1 | 6/2004 | Chua et al. |
| 2004/0133379 A1 | 7/2004 | Kobayashi et al. |
| 2004/0183926 A1 | 9/2004 | Fukuda et al. |
| 2005/0070245 A1 | 3/2005 | Nath |
| 2005/0164682 A1 | 7/2005 | Jenkins |
| 2005/0239479 A1 | 10/2005 | Bednasz |
| 2005/0255874 A1 | 11/2005 | Stewart-Baxter et al. |
| 2006/0148490 A1 | 7/2006 | Bates et al. |
| 2007/0072553 A1 | 3/2007 | Barbera |
| 2007/0270122 A1 | 11/2007 | Ewell |
| 2008/0009296 A1 | 1/2008 | Han |

FOREIGN PATENT DOCUMENTS

| | | |
|---|---|---|
| EP | 0921667 A2 | 6/1999 |
| EP | 1467543 A2 | 10/2004 |
| GB | 2378878 B | 2/2003 |
| WO | 9717685 A1 | 5/1997 |
| WO | 03028342 A2 | 4/2003 |
| WO | 03043356 A1 | 5/2003 |
| WO | 2004008434 A1 | 1/2004 |
| WO | 2005094109 A1 | 10/2005 |
| WO | 2006128785 A1 | 12/2006 |
| WO | 2007109597 A2 | 9/2007 |
| WO | 2008001125 A1 | 1/2008 |
| WO | 2008109292 A2 | 9/2008 |
| WO | 2008109477 A1 | 12/2008 |

OTHER PUBLICATIONS (Author Unknown); "Americans Not Doing Enough to Ensure Safe Driving;" U.S. Newswire; Sep. 30, 2004.

Katsutoshi, Hayashi; "Portable Electronic Device"; Aug. 15, 1997; JPO; published in Japan [translated abstract for Japanese Patent Publication No. 09212462 A].

Hirohide, Miwa; "Mobile Communication System in Common Use for Pager and Terminal Equipment for the System"; Jul. 15, 1997; JPO; published in Japan [translated abstract for Japanese Patent Publication No. 09187078 A].

Schmidt, Charlie; "The Road Ahead"; Technology Review; Jul. 1, 2001; p. 73; vol. 104, Issue 6; MIT.

(Author Unknown); "SiRF Announces a Novel and Cost Effective Vehicle Positioning Approach for Navigation & Telematics Products"; May 16, 2005; Newswire.

(Author Unknown); "Fatal Distraction"; Jun. 27, 2001; St. Louis Dispatch; p. B6; Pulitzer Publishing Company.

(Author Unknown); "CSI Wireless' New Asset-Link™ Products Win Carrier Approvals, Attract $1M+ of Initial Sales"; Aug. 16, 2005; PRNewswire.

Cain, et al.; "Investigation of the Use of Mobile Phones While Driving"; Apr. 1999; Center for Urban Transportation Research, College of Engineering, University of South Florida [available at http://www.cutr.usf.edu/its/mobile_phone.htm].

(Author Unknown); "An Investigation of the Safety Implications of Wireless Communications in Vehicles"; Nov. 1997; Preface, Executive Summary, Report Summary, and Chapter 6; National Highway Traffic Safety Administration [available at http://www.nhtsa.dot.gov/people/injury/research/wireless/].

(Author Unknown); "Collision Risk is Four Times Greater When Using Cell Phone While Driving"; Aug. 31, 2000; University of Minnesota.

Knowles, Brian; "Should Using a Cell Phone While Driving Be Illegal?"; Jun. 15, 2000.

Incantalupo, Tom; "Driving Under Influence of a Phone"; Jul. 23, 2003; Newsday.

(Author Unknown); "NJ Wants Tougher Cell Phone Driving Ban"; Sep. 28, 2005; Associated Press.

Warner, Jennifer; "Listening Poses Cell Phone Driving Dangers"; Aug. 26, 2005; WebMD.

(Author Unknown); "Cell Phone Driving Bans Don't Always Work"; Feb. 10, 2004; Health on the Net Foundation.

Roma, Shelly; "Young Cell Phone Drivers' Dial-emma"; 2005; MSNBC.com.

(Author Unknown); "Countries that Ban Cell Phones While Driving"; (date and source unknown).

* cited by examiner

START/STOP DRIVING OPTIONS

CHOOSE YOUR DEFAULT PHONE PROFILE WHEN EXITING ZOOMSAFER:

NORMAL
VIBRATE
LOUD
QUIET
PHONE
OFF

WOULD YOU LIKE TO ACTIVATE ZOOM SAFER AUTOMATICALLY USING SPEED DETECTION OR MANUALLY?

○ AUTOMATIC
○ MANUAL

NOTIFY PRIORITY CONTACTS THAT YOU ARE DRIVING BY SENDING:

☐ EMAIL
☐ SMS

WOULD YOU LIKE TO UPDATE YOUR SOCIAL NETWORK STATUS WHEN YOU START AND STOP DRIVING?

☐ TWITTER          ☐ FACEBOOK

USERNAME          USERNAME
PASSWORD          PASSWORD

FIG. 6

SAFETY FEATURES FOR PORTABLE ELECTRONIC DEVICE

CROSS-REFERENCES TO RELATED APPLICATIONS

This application is taking priority from U.S. Provisional Application 61/166,860, filed 6 Apr. 2009, and is a continuation-in-part and claims priority to U.S. patent application Ser. No. 12/394,413, filed 27 Feb. 2009, which is a continuation of U.S. patent application Ser. No. 11/285,556, filed Nov. 22, 2005, now U.S. Pat. No. 7,505,784, which takes priority from U.S. Provisional Application 60/720,528, filed 26 Sep. 2005, all of which are incorporated herein by reference.

BRIEF DESCRIPTION OF THE INVENTION

Methods and apparatuses for managing one or more cellular mobile devices and cellular mobile device operations are disclosed. The methods and apparatuses include software for cellular mobile devices that can automatically detect when a cellular device user is driving, intelligently manage inbound activity to the user, and alert the user in a manner allowing the user to remain focused on the driving activity while at the same time remaining connected automatically and transparently to other cell phone users via social networks, text messaging and emails.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BACKGROUND OF THE INVENTION

There are a variety of safety concerns associated with using portable electronic devices (e.g., cellular telephones) while driving a vehicle or during other activities. A variety of measures have been taken to address such concerns, including legal measures.

Smart phones and mobile devices have made it easier to remain connected with peers at all times, but when using a mobile device while driving serves as a distraction that can be dangerous to not only the driver but to other drivers on the roads. In addition, research has shown that people who multitask are not able to focus as effectively as those who do a single task at a time. Showing that activities that divide our attention while driving increase the risk for the driver and for other drivers on the road. Some of the tasks affected by distracted driving include lane positioning, speed control, car following, situation awareness, and hazard recognition.

The use of a mobile device is not limited to voice communications. Texting continues to be on the rise and several studies have shown that texting while driving increases distraction while driving. An 18 month study by the Virginia Tech Transportation Institute concluded that the risk of crashing was 23 times greater when drivers were texting than when not texting. Several states across the United States have placed bans of differing degrees on cell phone use. For example, some states have banned hand-held cell phones, while others have only banned the act of texting. Other states have banned all cell phone use while driving, while others have partial bans or bans only for young drivers.

While distracted driving seems to focus on teenage use, recent studies have shown that parents and adults do not practice safe driving habits, regardless of local safe driving laws. A safe driving solution is needed that eliminates distractions but allows drivers to remain connected with friends, family, co-workers and social networks.

Solutions have been proposed which disable or turn off a mobile device when it is detected that the mobile device is traveling at a certain speed. In this case, the mobile device detects its traveling speed, and based on this it may turn off the mobile device or block certain functions, such as texting. However, a primary problem is that the mobile device cannot tell the difference of when the user of the mobile device is driving or when the user is a passenger in a vehicle, a bus, a train, etc. U.S. Pat. No. 7,590,405 takes a different approach by disabling the mobile device as soon as it connected with a control system and then allowing it to be enabled under certain circumstances.

Other solutions include the use of geographic indicators, via GPS, to disable a mobile device when the device is in an area designated as not allowing mobile device use while driving. It has been shown the disabling of a portable electronic device based on the traveling speed of the device, as is shown in U.S. Pat. Nos. 6,108,532, 6,188,315, 6,266,589, and 6,311,078.

Geofencing is a virtual perimeter on a geographic area using a location-based service, such as GPS, that can generate notifications when a target device enters or exits the virtual perimeter. The notification may include location of the device and may be sent to a mobile device or an email account. Geofencing can be used to notify parents when a child leaves a designated area. Geofencing has also been used to designate places of work, customer sites, and secure areas. Crossing a geofence may trigger sending a message to a user or can be linked to immobilization of equipment or disablement of features of a device. A mobile device may be disabled based on a geographic location, such as geofencing, or by identifying regional use restrictions as is shown in U.S. Pat. Nos. 6,937,868, 6,961,561, 6,973,333, and 7,343,148.

Most of these references deal with preventing use of the device if the device is moving or within a certain area. This assumes that the user is the driver of the vehicle moving, or someone who is not authorized to use a device within the geographic area. There are situations where a user is a passenger in a car, a bus, a train, or not subject to geographic user restrictions, and needs the ability to override a disablement. Examples of overriding disablement are shown in U.S. Pat. Nos. 6,731,925 and 7,065,349.

The use of a timer in association with an activation function or a disablement function has been proposed. For example, once it has been determined that a device is moving above a certain speed threshold, or within a geographic area, but the device is in use at the time one of these events occurs, the timer determines how long such use can continue. Other timer based functions include waiting a period of time before disablement or activation, even if the device is not in use, if the period of time of a disabling event is short. Examples of the use of a timer in association with an activation function or a disablement function have been shown in U.S. Pat. Nos. 6,771,946 and 7,065,349.

It has further been shown that it may be desirable to send notifications or alerts to a second user who attempts to communicate with a first user whose device has been disabled.

The notice or alert sent to the user of the second device would include specific information about the state of the first device, such as whether the user is currently driving or if the user of the first device is in an area where the device cannot be used. The sending of these notifications or alerts would be triggered by the disablement function. Examples of sending such notifications or alerts are shown in U.S. Pat. Nos. 6,937,868, 6,496,703, 6,311,078, and 7,065,349.

An alternative is altering how specific features operate versus disabling those functions. Some art is directed to enabling some calls, such as 911 calls while not allowing others, however, the alteration focuses on whether certain functions can be used. For example, the text function would be blocked completely unless it was used through a hands-free, voice-based system. Examples of this are shown in U.S. Pat. Nos. 6,937,868, 6,687,497, 7,433,680, and 7,590,405.

U.S. Pat. No. 6,690,940 shows a system for selectively disabling use of at least selected features of a stand-alone electronic device under a predetermined set of conditions. The system establishes a state of the set of conditions as being satisfied or unsatisfied, communicates the state to the electronic device, and disables the selected features if the state is satisfied. In one embodiment, the system may advantageously be used to prevent vehicular accidents by at least partially disabling non-emergency use of a wireless telephone in a moving vehicle. In another embodiment, the system may be used to disable features of an electronic device within a predetermined area having a boundary that is independent of a communications network cell.

Users need a solution that minimizes distractions while driving, but which allows them to remain connected with other users with minimal intervention from the user.

BRIEF DESCRIPTION OF THE SEVERAL VIEWS OF THE DRAWING

FIG. 6 illustrates safe driving options accessible through the dashboard interface in accordance with an embodiment;

DETAILED DESCRIPTION OF THE INVENTION

Figure 1:
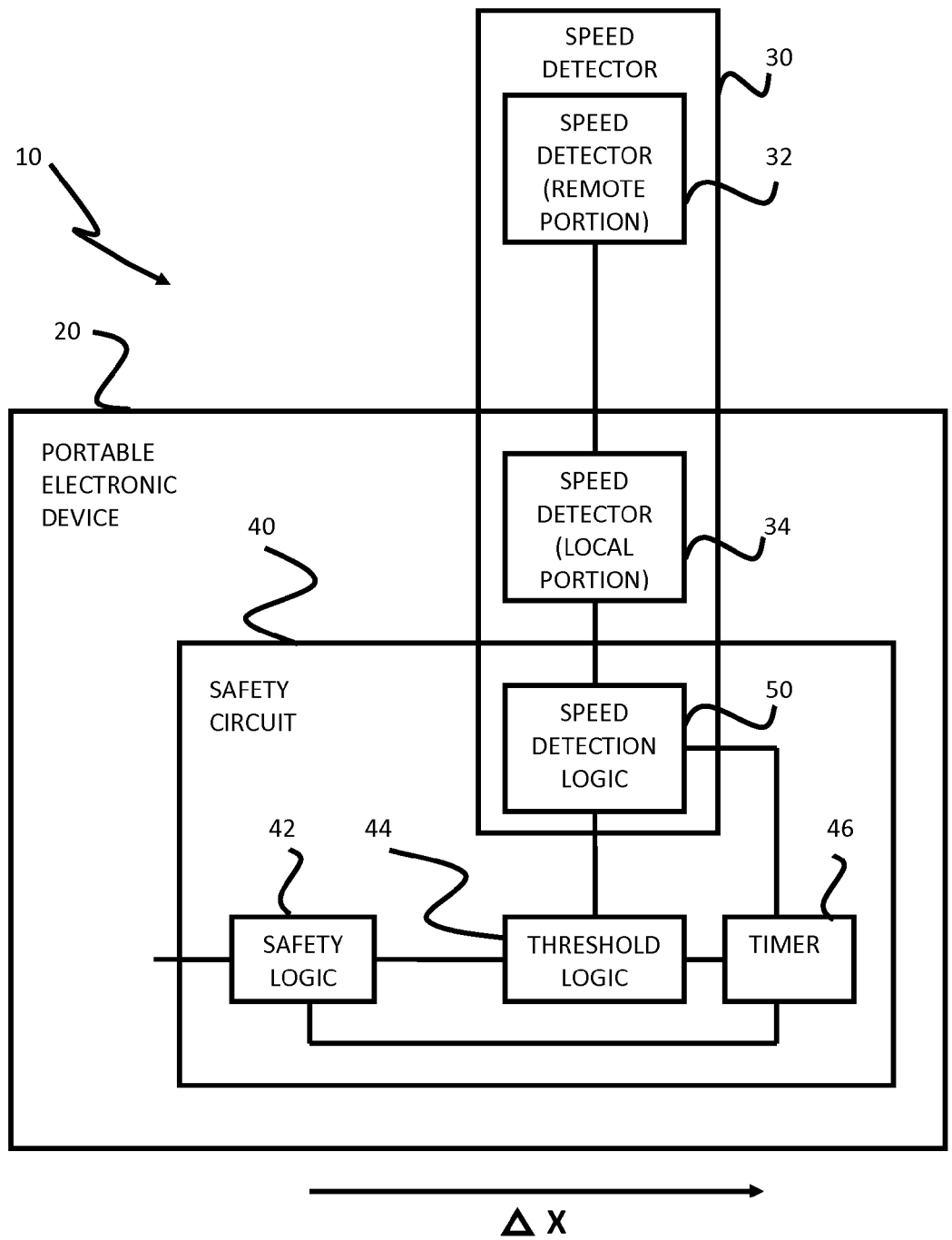
FIG. 1 is a schematic view of an exemplary portable electronic device system.

Methods and apparatuses for managing one or more portable electronic devices and portable electronic device functions are described herein. The methods and apparatuses include software for portable electronic devices that can automatically detect when a portable electronic device user is driving (or which can be activated in other ways), intelligently manage inbound activity to the user, and alert the user in a manner that allows the user to remain focused on his or her driving activity while at the same time remaining connected via the portable electronic device, automatically and transparently to other users, friends, family, customers and other important contacts via social networks, text messaging, emails, instant messages and other communication methods.

From herein the term "safe mode," "driving mode," and "safe driving mode" will be used to refer to the behavior of a portable electronic device being modified when it is detected that the portable electronic device is traveling at driving speed, or when one or more user defined safety thresholds are met. The safe mode is activated by the safety circuit, disclosed herein. Although references may be made herein to a cellular phone or cellular device as an example of the portable electronic device, the description is not limited to use on cellular type devices alone. Any type of communication device using any type of communications network could likewise practice the embodiment illustrated herein.

Likewise, the following description should not be used to limit the scope of the embodiments and the invention disclosed herein. Other examples, features, aspects, embodiments, and advantages of the invention will become apparent to those skilled in the art from the following description. As will be realized, embodiments are capable of other different and obvious aspects, all without departing from the invention. For example, factors other than speed can be used to activate a safety feature or invoke a safety policy. Instead of measure speed, the portable electronic device could detect movement that is unrelated to speed. If a user is wearing a phone on their hip or has the phone in a bag or pocket, the phone will move in a manner different than if the same device was in a car or vehicle. This non-liner movement could be measured and used to determine that the user is walking or running. So as to prevent the user from being in danger in traffic on a busy street, a safety policy could be evoked when such movement is detected to prevent the user from using features or functions of the device while moving in this fashion. Likewise, when this type of movement is detected, the safety policy could be set to understand the user was no longer driving and could therefore stop blocking functions or features that were being blocked. Other forms of movement could be used for similar purposes.

Accordingly, the drawings and descriptions should be regarded as illustrative in nature and not restrictive. It should therefore be understood that the inventor contemplates a variety of embodiments that are not explicitly disclosed herein.

An embodiment adds to or extends the functionality of a portable electronic device, its applications and the communications network it utilizes while a user with the device is driving. It includes the ability to determine the speed at which a motor vehicle is operating. This speed detection ability is accomplished by various means, including by known GPS systems, by processing location information from cell site information, by a combination of handset and network based information, by network based information alone, by vehicle equipment, by equipment added on to the vehicle, or even by manual entry. An embodiment improves the safety of a driver while using a mobile device, its applications and services by allowing the driver of a motor vehicle to keep focused on the road and hands on the steering wheel instead of on the mobile device.

An embodiment manages incoming and outgoing calls, alerts, and messages while a user is driving a motor vehicle. For example, in response to an incoming call or a text based communication the portable electronic device can record the incoming communication on the portable electronic device, while suppressing any visual or audio alerts until the user has stopped driving. The actions taken by the portable electronic device when a user is driving can be defined according to a safety policy. The safety policy can be broad, such as disabling all functions of the portable electronic device when in safe mode. The safety policy can also be very detailed, such as suppressing alerts for emails, auto-reply to text messages, and automatic status updates of social network sites.

Embodiments are not restricted to having a safety policy. An embodiment can disable or modify the behavior of one or more functions of the portable electronic device while the user is driving using a default set of options. In this case the user can have the option to override.

An embodiment manages and integrates third party applications. An embodiment enhances the answering and responding to incoming calls, emails, text messages in the environment of a portable electronic device, including the notification and answering "tone" or "message" that audibly alerts the user and if applicable provides hands-free and voice-based mechanisms to respond. An embodiment also transmits status messages transparently and automatically while the user is driving a motor vehicle.

In an embodiment, the user can control the operation of the portable electronic device when engaged in safe mode by voice-recognized actions, including the audio output control and input commands. The device may receive specialized notifications, such as personalized ring-tones, to alert the user of different incoming messages based on type of message and sender of the message. A priority list and/or contact list may also be enabled on the mobile device, for later synchronization with other devices, or other manipulation. The priority list is used to filter and respond to alerts, notifications, tones and messages based on a set of policies or rules.

For example, an embodiment operates when a motor vehicle is being driven. An embodiment detects when the device is in a moving vehicle from an initial stopped position, at the beginning of a user's journey. This detection may be accomplished by several means, including by known GPS systems, by processing location information from cell site information, by a combination of handset and network based information, by network based information alone, by vehicle equipment, by equipment added on to the vehicle, or even by manual entry. Other location based detection services can be used to determine when the user is in a motor vehicle, including connection with a cradle or charger, connection with a BLUETOOTH system in a motor vehicle, connection with a personal navigation device, activation of some other type of key or token mechanism associated with the vehicle, or the like.

An embodiment provides near-real-time status of the portable electronic device in terms of "speed". When the system determines that the device is moving faster than a pre-determined threshold speed, such as 10 miles per hour, an embodiment automatically engages so as to restrict incoming and/or outgoing activity and to enhance access to certain applications and services provided by the portable electronic device to make them safer to the user. The speed can then be monitored on a regular basis to determine if it stays consistently above the threshold speed so that the desired restricted activity stays engaged. The user may also manually opt out of the safe driving application, by entering a special code, pressing a designated button on the portable electronic device, or by issuing a voice command. The manner in which a user chooses to manually opt out of the safe driving application will depend on a set of policy settings specified by the user. Moreover, an embodiment operates so as to distinguish between temporary speed limits below the threshold. An embodiment thus engages when the portable electronic device is detected to be moving above a threshold, remains engaged through various driving activities (including routine stop-and-go travel situations), and disengages when the user reaches his or her destination or selectively makes a specific action to disengage the application.

An embodiment allows the user to remain focused while driving by auto-replying to incoming calls, text messages, email, instant messages, or other types of incoming messages. Auto-replies inform the other party that the user is busy driving. Status messages can also be sent to a pre-determined list of contacts based on status changes of the portable electronic device. These status messages provide information about the state of the user which may include location, speed, direction, or geo-location information for a third-party application. The status messages may also be posted to social networking sites, a blog, or to any other website with an API that supports the posting of status messages.

In FIG. 1, an exemplary portable electronic device system (10) is shown, comprising a portable electronic device (20) and a speed detector (30). In one embodiment, the portable electronic device (20) comprises a cell phone. As used herein, the term "cell phone" shall be read to also include devices having walkie-talkie features. Also as previously noted, a portable electronic device (20) may comprise a variety of other electronic devices, including but not limited to cellular devices, mobile devices, portable digital assistants (PDA's), laptop computers, netbooks, smartbooks, MP3 players such as I-PODS and the like, other telecommunications devices, other data processing devices, and the like. Other suitable examples of a portable electronic device (20) will be apparent to those of ordinary skill in the art.

In the embodiment illustrated in FIG. 1, a local portion (34) of the speed detector (30) is integral with the portable electronic device (20). It will be appreciated that the entirety of speed detector (30) may be integral with or otherwise local to the portable electronic device (20). Alternatively, the entirety of speed detector (30) may be separate from, outside of, or otherwise remote relative to the portable electronic device (20). Still other suitable relative configurations of portable electronic device (20) and speed detector (30) will be apparent to those of ordinary skill in the art. Exemplary embodiments of the portable electronic device (20) and the speed detector (30) will be discussed in greater detail below, while other embodiments will be apparent to those of ordinary skill in the art in view of the teachings herein.

The speed detector (30) of the present example comprises a remote portion (32) and a local portion (34). In this example, the remote portion (32) is positioned outside of the portable electronic device (20); while the local portion (34), to the degree it exists at all, is positioned within the portable electronic device (20). The remote portion (32) is in communication with the local portion (34). The speed detector (30) further comprises a speed detection logic (50) in communication with the local portion (34). Of course, the speed detection logic (50) may be in communication with remote portion (32) in addition to or as an alternative to being in communication with local portion (34).

In the present example, the speed detector (30) is operable to determine the speed at which the portable electronic device is traveling (e.g., linear speed), and is configured to communicate a signal from the speed detection logic (50) that is indicative of that detected speed. Various methods and devices for accomplishing such speed detection will be described in greater detail below, while others will be apparent to those of ordinary skill in the art in view of the teachings herein. Furthermore, other signals could be used in place of a signal indicative of detected speed, such as a manual signal, some form of signal indicating that the phone is in a vehicle, or that the vehicle is turned on, etc.

In one embodiment, the speed detector (30) comprises a Global Positioning System (GPS). In particular, a remote portion (32) of the speed detector (30) comprises one or more GPS satellites; while a local portion (34) of the speed detector comprises a GPS receiver. Various ways in which a GPS system may be used in accordance with several embodiments will be discussed in greater detail herein, while others will be apparent to those of ordinary skill in the art in view of the teachings herein. In addition, components other than GPS systems that are suitable for providing a speed detector (30) will be apparent to those of ordinary skill in the art.

In another embodiment, speed is determined using land-based signal triangulation techniques. In this embodiment, the portable electronic device (20) comprises a transmitter/receiver as a local portion (34) of a speed detector (30); with a remote portion (32) of the speed detector (30) comprising a plurality of fixed base stations. For instance, three fixed base stations may send a signal, with the transmitter/receiver sending a responding signal. The time it takes for these signals to arrive may be used in a mathematical triangulation algorithm to calculate an approximate position of the cell phone, with changes in position leading to speed. Suitable triangulation techniques for obtaining traffic information and providing emergency response are disclosed in U.S. Pat. No. 6,901,264, the disclosure of which is incorporated by reference herein. Of course, any number of base stations may be used, as may any other variation of the triangulation techniques described above. Similarly, any other type of speed detector (30) may be used.

The portable electronic device (20) of the present example comprises a safety circuit (40). In the present example, safety circuit (40) resides within the portable electronic device (20). However, it will be appreciated that all or part of safety circuit (40) may reside outside of the portable electronic device (20). The safety circuit (40) comprises a safety logic (42), a threshold logic (44), and a timer (46). In the present example, the speed detection logic (50) is also part of the safety circuit (40) (i.e., in addition to being part of the speed detector (30)). The timer (46) is operable to communicate a signal indicative of time, such as a periodic pulse or the like. The timer (46) is in communication with the speed detection logic (50), the threshold logic (44), and the safety logic (42) in this example. Those of ordinary skill in the art will appreciate, however, that timer (46) may be in communication with less than all of these components, or may be otherwise substituted, supplemented, or omitted altogether.

In one embodiment, the remote portion (32) and the local portion (34) of speed detector (30) are operable to determine positioning of the portable electronic device (20). The remote portion (32) and local portion (34) of speed detector (30) are further operable to communicate such positioning information to the speed detection logic (50). With at least two sets of positioning information, the speed detection logic (50) is operable to calculate a distance traveled by the portable electronic device (20). Using the timing signal communicated by the timer (46), the speed detection logic (50) is operable to calculate the speed at which the portable electronic device (20) is traveling by dividing the distance traveled by the time taken to travel that distance. The speed detection logic (50) then communicates a signal to the threshold logic (44) indicative of the speed calculated by the speed detection logic (50). Of course, a variety of alternative methods and techniques may be used to determine the speed at which portable electronic device (20) is traveling, all of which are contemplated herein.

In another embodiment, the speed detector (30) is configured to take positioning readings at predetermined time intervals. In this embodiment, the timer (46) is used to communicate the passage of such time intervals to the speed detector (30). Thus, with the time interval between first and second positions being known, the timer (46) need not be in communication with the speed detection logic (50). That is, the value of the predetermined time interval may be already incorporated into the speed detection logic (50). In yet another embodiment, the timer (46) communicates passage of a predetermined time interval to the speed detection logic (50), and the speed detection logic (50) uses such a communication to command the local portion (34) and/or remote portion (32) of the speed detector (30) to take positioning readings at such times. Still other suitable structural and logical configurations will be apparent to those of ordinary skill in the art.

The threshold logic (44) in this example is configured to compare the speed indicated by the signal communicated by the speed detection logic (50), the speed signal, to a threshold value. When the value of the speed signal exceeds the threshold value, the threshold logic (44) is configured to communicate a threshold exceeded signal to the safety logic (42) to indicate that the threshold has been exceeded. In one embodiment, where the threshold logic (44) is further in communication with the timer (46), the threshold logic (44) is configured such that it will communicate the threshold exceeded signal to the safety logic (44) only when the speed threshold has been exceeded for a certain amount of time. In other words, in this embodiment, the threshold logic (44) is configured to determine the amount of time during which the portable electronic device (20) is traveling beyond a threshold speed. In another embodiment, the threshold logic (44) simply communicates a threshold exceeded signal to the safety logic (42) when the threshold speed has been exceeded, and the safety logic (42), being in communication with the timer (46), determines whether the threshold speed has been exceeded for a certain amount of time. In either case, it will be appreciated that the threshold exceeded signal communicated by threshold logic (44) may be substantially instantaneous (e.g., a single pulse) to indicate that the threshold has been exceeded, may be continuous during the time that the threshold is being exceeded, or may have any other duration(s) or properties.

In the present example, the safety logic (42) is operable to communicate one or more signals to another component of the portable electronic device (20). Such a signal may be communicated in response to an indication from the threshold logic (44) that the speed threshold has been exceeded, that the speed threshold has been exceeded for a certain period of time, or in response to any other condition(s). In this example, the signal(s) communicated by the safety logic (42) is configured to disable one or more functions of the portable electronic device (20), as will be described in greater detail below.

It will be appreciated that safety logic (42) may be configured such that different signals may be communicated by safety logic (42) in response to different speed thresholds being exceeded and/or other different conditions, with such different signals being communicated from safety logic (42) effecting the disablement of different functions of the portable electronic device (20). In other words, safety logic (42) may be configured to disable a variety of functions of portable electronic device (20) in response to a variety of conditions, including combinations thereof. By way of example only, the conditions triggering such a response from the safety logic (42) may comprise one or both of speed and time. As another example, where a plurality of functions may be disabled in response to a plurality of conditions, the particular function(s)

disabled may be dependent upon a particular condition or particular conditions. Other suitable conditions and responses will be apparent to those of ordinary skill in the art.

Figure 2:
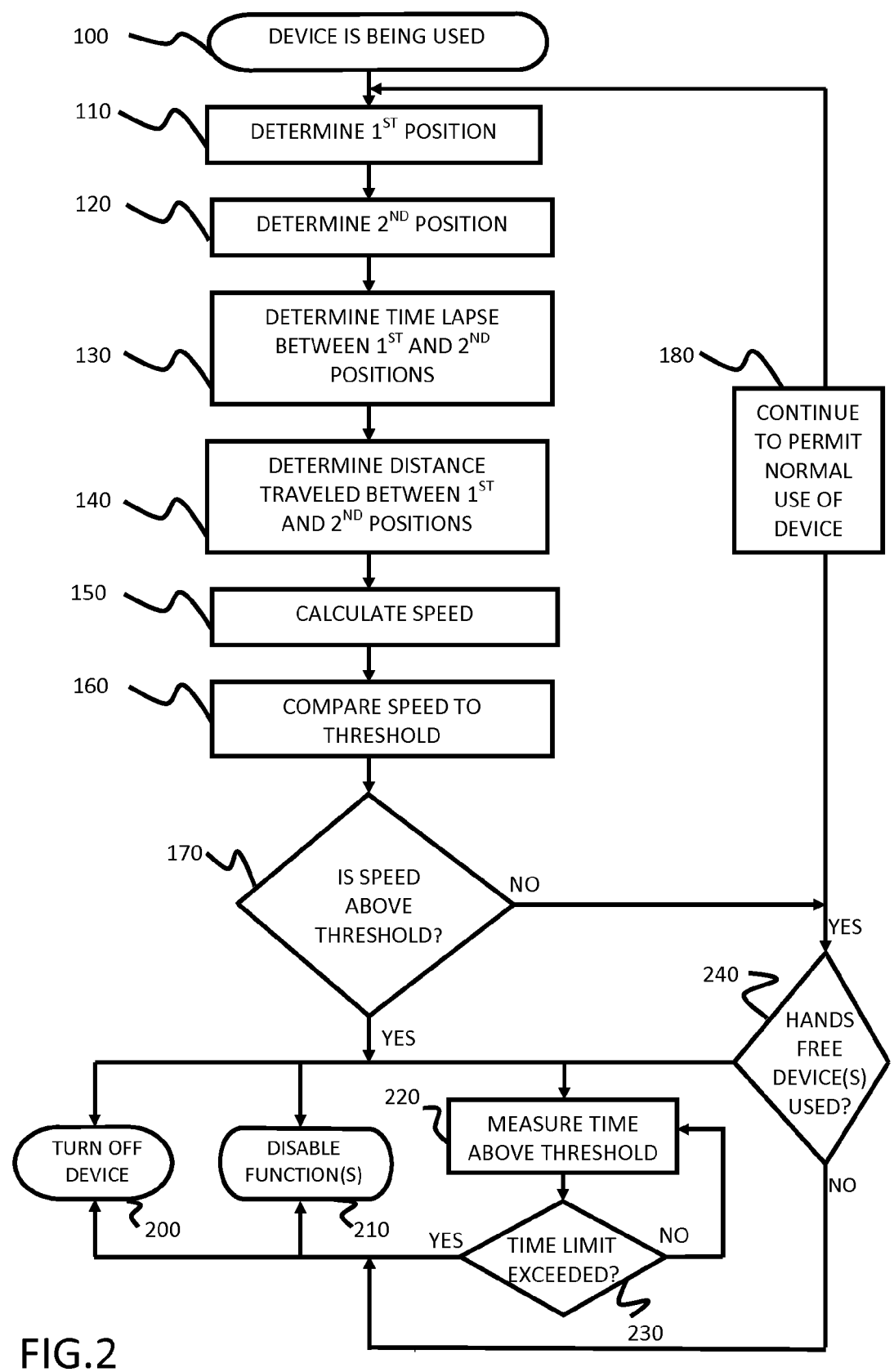
FIG. 2 is a block diagram showing an exemplary set of steps that may be performed by the system shown in FIG. 1.

A flow diagram is provided in FIG. 2 to illustrate several possible steps that may be used in performing exemplary methods in accordance with several embodiments described herein. In block (100), the portable electronic device (20) is being used. In block (110), a first position of the portable electronic device (20) is determined. In block (120), a second position of the portable electronic device (20) is determined. It will be appreciated that such positioning determinations (110, 120) may be performed using one or both of the remote portion (32) and the local portion (34) of the speed detector (30), and/or using any other suitable component(s).

In block (130), the lapse of time between the portable electronic device (20) being in the first and second positions is determined. It will be appreciated that such a lapse of time determination (130) may be performed using the speed detection logic (50) and/or timer (46), and/or using any other suitable component(s). It will also be appreciated that the lapse of time may be a predetermined value as described above. In other words, the positioning determinations (110, 120) may be made at predetermined time intervals, such that the lapse of time between the two positions is predetermined. The timer (46) may be used to provide such a predetermined time interval. Suitable time intervals for making positioning determinations (110, 120) in such an embodiment will be apparent to those of ordinary skill in the art.

In yet another embodiment, predetermined time intervals are used by default, with ad hoc time intervals being determined (130) where the second position cannot be determined (120) for whatever reason at the expiration of the default predetermined time interval. For instance, where a speed detector (30) comprises a GPS system, a predetermined time interval for making positioning determinations (110, 120) may be used by default, with an ad hoc time interval being determined (130) when the second position cannot be determined (120) at the expiration of the predetermined time interval when communication of the GPS system breaks down due to temporary interference with or obstruction of the GPS signal. Still other variations will be apparent to those of ordinary skill in the art.

In block (140), the distance traveled by the portable electronic device (20) between the first and second positions is determined. Such a distance traveled determination (140) may be performed by the speed detection logic (50) and/or any other suitable component(s). This distance traveled determination (140) may be based on the first and second positions determined in blocks (110) and (120), or may be otherwise determined.

Next, in block (150), the speed at which the portable electronic device (20) is traveling is determined. Such a speed determination (150) may be performed by the speed detection logic (50) and/or any other suitable component(s). In one embodiment, the speed is calculated by dividing the distance traveled, as determined in block (140), by the time taken to travel that distance, as determined in block (130). Of course, any other methods and/or components may be used to determine the speed at which the portable electronic device (20) is traveling.

In block (160), the speed calculated in block (150) is compared to a threshold. Such a threshold comparison (160) may be performed by the threshold logic (44) and/or any other suitable component(s). In one embodiment, the speed threshold is approximately equal to average walking speed (e.g., 2-4 mph). In another embodiment, the speed threshold is approximately equal to average running speed (e.g., 4-10 mph). In yet another embodiment, the speed threshold is approximately 25 mph. In addition, it will be appreciated that several thresholds may be used. For instance, the applicable threshold may depend on a variety of conditions (e.g., location, the type of device, etc.). In another embodiment, a speed threshold is set by a consumer as described in greater detail below. Still other suitable speed threshold values, as well as ways in which the use of speed thresholds may be varied, will be apparent to those of ordinary skill in the art.

In block (170), it is determined whether the speed calculated in block (150) is in excess of the threshold. This determination (170) may be performed by the threshold logic (44) and/or any other suitable component(s). If the determination of block (170) is that the speed of the portable electronic device (20) is not above the threshold, the method may proceed to block (180), which comprises continuing to permit normal use of the portable electronic device (20). In such a situation, the method may proceed back to block (110), to determine positioning, time lapse, distance traveled, speed, etc. again.

It will be appreciated that some level of data processing may be required in order to determine speed (150) and/or to compare the determined speed to a threshold (160). In one embodiment, the processing is performed locally (e.g., within the portable electronic device (20)). In another embodiment, the processing is performed remotely (i.e., remote from the portable electronic device (20)). Of course, the processing may also comprise a combination of local and remote processing.

As shown in FIG. 2, a variety of responses may be provided upon a determination (170) that the speed is in excess of the threshold. One exemplary response is to simply turn off the portable electronic device (20), as shown in block (200). For instance, all further use of the portable electronic device (20) may be prevented until the speed falls back below the threshold when the portable electronic device (20) is turned back on.

Another exemplary response is to disable one or more functions of the portable electronic device (20), as shown in block (210), and as will be described in greater detail below. It will be appreciated that the above responses (200, 210) may be provided via a signal from the safety logic (42) and/or any other suitable component(s). In one embodiment, the portable electronic device (20) is a telecommunications device that provides voice communication and text messaging. In this embodiment, transmission of such voice and text is blocked as part of a function disabling response (210). In another version of this embodiment, text messaging capabilities are disabled while voice communication is permitted. Other variations will be apparent to those of ordinary skill in the art. The disablement of a function (210) of a portable electronic device (20) may be referred to herein as a "blocking function." Thus, as used herein, it will be appreciated that a "blocking function" is operable to block, disable, or otherwise affect another function of a portable electronic device (20).

In another embodiment, the portable electronic device (20) is a telecommunications device that provides walkie-talkie communication. For instance, an example of such a portable electronic device (20) in this embodiment may be a cell phone that has a walkie-talkie or push to talk feature. In this embodiment, the walkie-talkie functioning of the portable electronic device (20) is disabled as part of a function disabling (210) response. Of course, other variations with such a device may be used.

In another embodiment, the portable electronic device (20) has a display screen. An example of such a portable electronic device (20) in this embodiment may be an I-POD or MP3- type player, cell phone, PDA, etc. In this embodiment, the display screen is disabled, blocked or is programmed to show a specific screen or set of screens as part of a function disabling response (210).

While several examples of complete or partial disablement of one or more functions have been described above, it will be appreciated that any other functions may be disabled as part of a function disabling response (210), including but not limited to disablement of incorporated games, cameras, internet access, applications, etc., including combinations thereof. In addition, where more than one speed threshold is used, certain responses may be associated with a particular threshold. Similarly, as will be described in greater detail below, certain responses may be provided at different time intervals during a period at which the speed is above a threshold.

Yet another exemplary response is to measure the time during which the speed is above the threshold, as shown in block (220). By comparing such time during which the speed is above the threshold against a time limit, a determination may be made as to whether the time limit has been exceeded, as shown in block (230). If the time limit has not yet been exceeded, the time during which the speed is above the threshold may continue to be measured (220) and compared against a time limit to determine (230) whether the time limit has been exceeded. Upon determining (230) that the time limit has been exceeded, a response; such as turning off the device (200) or disabling one or more functions of the device (210), may be provided. It will also be appreciated that more than one time limit may be used. For instance, a variety of time limits may be used, with one of the time limits being selected based on the speed calculated in block (150) or based on any other condition(s). Still other ways in which one or more time limits may be used will be apparent to those of ordinary skill in the art. It will also be appreciated that the timer (46) and/or any other suitable device may be used to measure (220) the time during which the speed is above the threshold and/or determine (230) whether a time limit has been exceeded.

In yet another embodiment, the portable electronic device (20) is configured to be selectively coupled with one or more hands-free devices, as will be described in greater detail below. In such an embodiment, as shown in block (240), a determination is made as to whether the hands-free device is being used. If it is determined (240) that a hands-free device is being used, the method may include continuing to permit normal use of the portable electronic device (20) as shown in block (180). In another embodiment, partial use of the portable electronic device (20) is permitted in response to determining (240) that a hands-free device is being used. In the present example, if it is determined (240) that a hands-free device is not being used, a response, such as turning off the device (200) or disabling one or more functions of the device (210), is provided. In yet another embodiment, the type of response provided upon a determination (240) that a hands-free device is or is not being used is dependent upon the type of hands-free device being used. Still other ways in which a response may be provided upon a determination (240) that a hands-free device is or is not being used will be apparent to those of ordinary skill in the art.

For instance, in one embodiment of the cell phone example, transmission and reception of voice-only communications is permitted when a hands-free earpiece and microphone attachment is used. In this example, the cell phone may further permit voice activated dialing and/or voice activated answering.

While several exemplary steps have been described above with reference to FIG. 2, it will be appreciated that any of those steps may be varied, substituted, omitted, or supplemented in any suitable way. It will also be appreciated that the steps need not be performed in the order shown. By way of example only, the time lapse determination (130) may be performed after the distance traveled determination (140). Alternatively (e.g., where the time lapse is predetermined), the time lapse determination (130) may be omitted. As another example, the determination (240) of whether a hands free device is being used may be performed before the first position determination (110), such that the first position determination (110) and the steps thereafter are simply not performed when it has been a determined that a hands-free device is being used (240). Still other ways in which the methods shown in FIG. 2 may be varied will be apparent to those of ordinary skill in the art.

While several embodiments have been described in general terms above, further embodiments will be described below in more specific terms in the context of a cell phone as a portable electronic device (20). It will be appreciated, however, that all of the embodiments described herein, regardless of the specificity of such descriptions, are merely exemplary.

In one embodiment, as described above and below, a portable electronic device is provided with a safety feature that is configured to implement policies regarding how and when the device can be used under certain circumstances, such as preventing use of a cell phone when the user and cell phone are traveling beyond a certain speed. It will be appreciated that a variety of techniques for detecting speed may be used, and that a variety of responses may be employed upon the detection of a certain speed. Several of such techniques and responses are described herein, while others will be apparent to those of ordinary skill in the art.

In the present example, a cell phone includes a GPS receiver. It will be appreciated that, by being able to determine the approximate positioning of an object, such GPS systems may also be used to determine the speed of an object. For instance, and as described above, the speed of an object may be determined by dividing the distance traveled by the object (e.g., calculated by taking two positioning readings) by time taken by the object to travel that distance (e.g., the time between the two positioning readings). A GPS system may thus be used to determine the linear traveling speed of a cell phone, and hence, the speed of a user of the cell phone. It will be appreciated that the accuracy or precision of positioning readings that are used to determine speed need not be great per se. In other words, in one embodiment, the actual location of the device is relatively unimportant, while the change in location of the device is more important. Alternatively, a device may be used where the actual location of the device is more important. In another embodiment, the actual location of the device and the change in location of the device are simply irrelevant (e.g., the speed is determined using an alternative technique).

In an embodiment, if the cell phone is equipped with an accelerometer (which many are so as to protect the phone by shutting it off prior to hitting the ground when the phone has been dropped), the detection of acceleration can be used in place of speed. As previously noted, the vehicle itself can also communicate with the phone or an intermediate device that is in communication with the vehicle which can in turn communicate information about the vehicle, or about the user, to the phone. For example, the vehicle could be equipped with devices (sensors, detectors, etc.) that determine the relative position or closeness of various electronic devices within the vehicle and provide signals to the cell phone in the driver's position that result in the phone being subject to restrictions on use, while other phones in the vehicle are not. Thus, while several devices and techniques for determining speed (150) have been described above, it will be appreciated that a variety of alternative devices and techniques may be used to determine speed (150). Such alternatives will be apparent to those of ordinary skill in the art.

In an embodiment, the cell phone could be configured to detect its speed when it is turned on, and before permitting further use. Subject to some conditions, the cell phone will permit further use upon being turned on only if the speed is below a certain threshold. If the speed is below the threshold, the cell phone will permit use until that threshold is exceeded. Thus, it will be appreciated that the cell phone may continue to monitor speed during use of the cell phone. Such monitoring may be substantially continuous, periodic, or be triggered by any suitable event(s) or condition(s).

Upon detecting that the speed has exceeded a speed threshold, or some other threshold have been met or exceeded or some other condition met, the cell phone of the present example is configured to provide one or more responses. For instance, such responses may be provided in the form of response functions or blocking functions. In one embodiment, a cell phone is simply turned off when the speed is above a threshold, and all further use of the cell phone is prevented until the speed falls back below the threshold when the cell phone is turned back on. In another embodiment, the cell phone remains on during the response, but the cell phone is configured to block transmission and reception of voice and text messaging (e.g., through standard telephony protocol, via a walkie-talkie feature, or otherwise, including combinations thereof), to conceal the display screen, and to disable incorporated games, cameras, internet access, applications, etc. Of course, a variety of alternative responses may be employed upon the detection that the speed has exceeded a threshold. When one or more response functions have been affected, the cell phone or other portable electronic device (20) may be considered to be in a "safe mode."

It will be appreciated that a portable electronic device (20) may optionally further comprise a feature configured to at least partially override the response/blocking function(s) under certain conditions. For instance, in one embodiment of the cell phone example, a feature is configured to override the blocking of transmission and reception of voice-only communications when a hands-free earpiece and microphone attachment is used. Such overriding may occur regardless of whether the earpiece and/or microphone is hard-wired or wireless. In this example, the cell phone may further permit voice activated dialing and/or voice activated answering. Of course, a variety of other conditions may trigger the overriding of one or more blocking functions. Other conditions, as well as other blocking functions that may be at least partially overridden, will be apparent to those of ordinary skill in the art.

As used herein, terms such as "override," "overridden," etc., shall be understood to refer to instances where one or more signals that effect a response/blocking/alerting function are present, but at least one of those one or more signals are nullified by one or more separate override signals.

Such terms shall also be understood to refer to an instance where at least one signal to effect a blocking function is simply removed. In addition, such terms shall be understood to include an instance where speed detection, threshold comparison, and/or some other portion of the methods described herein is not performed in response to the presence of a condition such as use of a hands-free device. In addition, the terms shall include all functional equivalents of these instances.

In yet another embodiment, at least a portion of the blocking function(s) is/are overridden when the user is a passenger in a car, train, airplane, etc. Alternatively, a portable electronic device (20) may be configured such that the speed detecting and/or blocking functions may be enabled only when the user is in a car or is driving a car.

In one example of this embodiment, such positioning of the user is determined by comparing GPS or other positioning data to a map, two-dimensional model of an environment, three-dimensional model of an environment, or the like. For instance, where a map or model includes streets, and the resolution of the GPS or other technology permits the determination of whether a user is closer to the middle of the street or the edge of the street (depending on the side of the street in which cars are generally driven in the user area and the side of the car in which the driver usually sits, the position of the user in a car (e.g., driver side or passenger side) may be inferred.

Such intra-vehicle positioning may be used to prevent the disablement of cell phone features despite a non-driving user's traveling speed being beyond the threshold. In other words, where the user of a portable electronic device (20) is a passenger in a car traveling at a speed above the threshold, and it is determined that the user is a passenger and not the driver of the car, one or more blocking functions may be prevented based on the determination that the user is a passenger and not the driver. Still other ways in which the status of a user of a portable electronic device (20) may be determined (e.g., whether the user is a driver or a passenger in a car), and ways in which such a determination may be used to influence the functioning of one or more components of a portable electronic device system (10) (e.g., a safety circuit (40)), will be apparent to those of ordinary skill in the art.

With respect to trains, ferries, boats, places, etc., a map or model may include data representing train tracks or a lack on nearby roads, such that it may be determined with the GPS that the user is traveling beyond the threshold speed over the train tracks, over water, in the air, etc., versus on a road. In this example, the portable electronic device (20) may continue to function as if the user were not moving at all, in spite of the fact that the user is traveling beyond the threshold speed. With respect to airplanes and the like, the speed detector (30) or other technology may provide altitude data sufficient to infer that the user is not driving a car. In another embodiment, an additional speed threshold is provided, whereby the cell phone will not switch to a safe mode when the speed exceeds this additional threshold. For instance, this additional threshold may be a speed at which airplanes typically travel, beyond a speed at which automobiles typically travel. In this example, a safe mode may be activated when the detected speed is between two thresholds, and not activated when the speed is below the first threshold or above the second threshold. Other ways for determining the position of a user within a vehicle, whether the user is driving a vehicle, and/or what type of vehicle a user is in, and ways in which such a determination may be used to influence the functioning of one or more components of a portable electronic device system (10) (e.g., a safety circuit (40)), will be apparent to those of ordinary skill in the art.

Notwithstanding the various potential overrides, such as those described above, the one or more responses to the detection of the speed exceeding the threshold may cease or otherwise be removed when the speed falls below the threshold. For instance, after detecting that the speed has exceeded the threshold, and implementing the response(s), the cell phone of the present example may continue to perform speed detecting functions on a periodic or other basis to determine whether the speed has fallen below the threshold. Upon detecting that the speed has fallen below the threshold, the cell phone of the present example may remove the blocking function(s) and permit unrestrained use until the speed again exceeds the threshold.

Alternatively, a timer, such as the timer (46) shown in FIG. 1, may be used such that blocking functions are removed only when the speed remains below the threshold for a certain period of time. For instance, in one embodiment, normal use of a portable electronic device (20) is permitted immediately upon a determination that the speed has fallen below the threshold. In another embodiment, normal use of a portable electronic device (20) is permitted only upon a determination that the speed has fallen below the threshold for a certain period of time. In yet another embodiment, using a tiered approach, a plurality of time periods are used as milestones, such that one or more functions are re-enabled at certain times after the speed has fallen below the threshold. Still other ways in which a timer (46), counter, or similar device may be used after the speed has fallen back below the threshold, including but not limited to the use of such a device to influence the re-enablement of one or more functions of a portable electronic device (20), will be apparent to those of ordinary skill in the art.

It should be appreciated, that at a certain level, the functions and operations of the safety circuit (40), the speed detector (30) or even the speed threshold are interchangeable. For instance, once the safety circuit has been activated, it can be configured to continue applying a policy, such as blocking, restricting, automatically replying, etc.) irrespective of whether the current speed of the portable electronic device (20) remains above the threshold, as long as the speed detector (30) is able to establish that the user of the device is still driving. This is important so the device does not suddenly become operable just because the driver is stopped at a light or railway crossing for some extended period of time. Thus, the current speed does not need to be the only factor to be considered when determining whether the policy is to continue being applied or if the safe driving mode of the device should remain active.

For example, as discussed above, a timer (46) or other device may be used such that the blocking functions are applied only when the speed exceeds the threshold for a certain period of time, or may be applied to allow the blocking functions to continue to be applied even though the speed does not exceed the threshold for some period of time. In another embodiment, where the portable electronic device (20) is a cell phone, normal use of the cell phone is at least partially permitted after the speed has exceeded a threshold, but a timer (46) or other device is used to place time limits on individual telephone communications made during the period that the speed is above the threshold. For instance, a cell phone may be configured such that telephone calls are only permitted to last one minute if the calls are made, received, or otherwise in progress during the time that the speed is above the threshold. Of course, any other duration limit may be used. In yet another embodiment of the cell phone example, a timer (46) is used to govern the frequency of telephone calls during the period that the speed is above the threshold. For instance, if a call ends during the period that the speed is above the threshold, a timer (46) may be used to prevent another call from being made and/or received until a certain amount of time has passed, so as to prevent users from circumventing the one minute time limit by stringing together calls.

Other ways in which a timer (46) or similar device may be used will be apparent to those of ordinary skill in the art. It will also be appreciated that a timer (46) may be substituted or supplemented in any suitable way. For instance, and without limitation, a counter or other device may be used to limit the number and/or frequency of calls made on a cell phone when the speed is above the threshold and/or within a certain period of time. For example, repeated calls to the same number could be blocked after a first or second call. The call frequency limit and the time limit placed on individual telephone communications made while the device is in safe mode may also apply when the device is used in hands-free mode.

In yet another variation, the cell phone of the present example may be configured to determine whether its speed has fallen below the threshold only when the user attempts to turn the cell phone on. For instance, in the embodiment where the cell phone is turned off when the speed exceeds the threshold, such as in the step indicated by block (200) in FIG. 2, the speed detection will cease until the cell phone is turned back on.

In embodiments where GPS or similar technologies are used to detect speed or position, it will be appreciated that occasions may arise where environmental factors or other factors may adversely affect the functioning of the GPS or other device. For instance, a GPS signal may be blocked while a user is traveling in a tunnel, between skyscrapers, etc., such that the speed of the portable electronic device (20) cannot be determined. In such situations, the portable electronic device (20) may be configured to default to a particular mode. In one embodiment, a portable electronic device (20) defaults to a safe mode when the speed cannot be detected due to GPS signal blockage or other reasons. In another embodiment, a portable electronic device (20) defaults to a fully operational mode when the speed cannot be detected due to GPS signal blockage or other reasons. In yet another embodiment, alternative speed detecting devices/techniques are used when a default speed detecting device/technique ceases to yield satisfactory results. Other ways in which the inability to detect speed may be addressed will be apparent to those of ordinary skill in the art.

In an embodiment, as noted above, an accelerometer may be used to determine the traveling speed of the portable electronic device when external speed detection signals are lost. For example, GPS or land based signal triangulation signals may be lost in tunnels or parking lots. The accelerometer can use the last detected speed to continue providing an estimate of the traveling speed of the device. The accelerometer may be integrated in the device, it may be external to the device and to the vehicle, or it can be integrated in the vehicle. In another embodiment, the current traveling speed can be received from the car via a wireless connection, such as a BLUETOOTH connection or other type of similar connection.

Alternatively, the portable electronic device may be docked into a port on the car, allowing for the traveling speed of the car to be transmitted directly to the portable electronic device. The traveling speed transmitted from the car may come directly from the vehicle's computer or it may be received from a built-in navigation system in the vehicle. In yet another embodiment, the traveling speed of the device would be received from an external stand-alone navigation system. Navigation systems provide geo-spatial positioning, most commonly by using GPS data. Popular navigation systems are manufactured by TOMTOM, GARMIN, MAGELLAN, and NAVIGON. The portable electronic device could connect with the external stand-alone navigation system or it could receive the positioning information wirelessly if supported by the external stand-alone navigation system. Alternatively, the external navigation system may connect to the portable electronic device via a port. In such instance, the third party speed or position reporting device could direct the operation of the phone, or the phone could respond in some way to the third party devices. If the portable electronic device has built-in GPS, then location information could be queried directly from the built-in GPS of the portable electronic device via an API. Location information could also be queried from the portable electronic device if the portable electronic device can deduce location information via Wi-Fi or via cellular towers.

The location requests and the calculation of the current speed based on the location requests can have a detrimental effect on the battery life of a portable electronic device. Typically, location requests to built in GPS or in assisted GPS (A-GPS) systems on a mobile device are singular in nature, such as "Where are you?" An application, either local or remotely will request updates on a specified time interval, such as every three minutes. These requests when done frequently, such as every few seconds, for real-time location or speed status, can have a negative impact on the battery life of the portable electronic device. In addition, a local or a remote request may be made to determine the average speed of the mobile device, by taking a location request at two defined intervals, and then calculating the speed. As a consequence, calculating the average speed on a regular interval will also significantly drain the battery life of a device.

In an embodiment, the battery life of the portable electronic device is maximized by changing the frequency of location/speed requests and the speed calculation based on user behavior and various trigger events, such that the frequency of location requests is made to match usage patterns by a specific user over time. For example, the frequency of location requests may initially be set to 30 seconds. However, after analyzing the usage by a specific user, it may be determined that the frequency of location/speed requests should be set to 30 seconds from 3 pm to 5 pm and to 5 minutes every other time.

A baseline time interval, baseline interval, for checking the traveling speed of the portable electronic device will be based on a number of factors. The baseline interval could be "0" in the case where the speed is only checked once the device has been paired with another token or device, such as occurs when using a hands-free interface with a BLUETOOTH device. In an embodiment, the baseline interval would be set to 30 seconds. However, any other time may be used for the baseline interval. The actual frequency of the location requests can fluctuate, by increasing or decreasing the baseline interval, based on certain pre-defined events. The frequency of the baseline interval may increase with events, with and without the use of the current location information, such as: the presence of a charger or other electrical source that would initiate charging of the portable electronic device; making or receiving phone calls; sending, receiving, or reading emails; sending, receiving, or reading text messages; the device being restarted or turned on; a location update of the mobile device via an external signal; and calendar events.

The amount of time, or running time, that a baseline interval is active can be based on the type of event that triggered the change in the baseline interval. For example, the baseline interval may increase from 30 seconds to 10 seconds, with the baseline interval remaining at 10 seconds for a period of 10 minutes (running time of 10 minutes), immediately after the mobile device is powered on. After the 10 minute running time period, the baseline interval may be changed to 15 seconds for the next 10 minutes, and after this second 10 minute running time period, the baseline interval might be set back 30 seconds until the next event is received. Alternatively, if a call is received, and the device is not engaged in safe mode, then the baseline interval could be set to 15 seconds until the call terminates or until five minutes after the call terminates. There are many variations for running times for baseline intervals, with the running time depending on the events occurring and on the specific usage patterns of the user.

In an embodiment, the day of the week and the time of day would be used to determine the value to use for the baseline interval. In another embodiment, the safe driving mode may be automatically enabled during a set of specified hours, without the speed checking, and allowing the user to exit to passenger mode if necessary.

In yet another embodiment, a policy can be used to specify settings and preferences related to the maximization of the battery life. For example, a battery saving policy can be created which specifies that a user is more likely to be driving during the 7 am to 9 am and the 4 pm to 7 pm commuting hours. The baseline interval could then be automatically increased during this time period to 10 seconds. Alternatively, the baseline checking could be reduced to every two minutes during non-commuting hours, or longer when the device is on, but not in use. The policy may also specify to only do the baseline checking during the specified driving hours.

In an alternative embodiment, the days and time of day when the portable electronic device has the most activity can be saved and stored on a data file for further analysis. The data file can then be analyzed to automatically identify times of day when the baseline interval should be increased or decreased. Peaks in the data file (local maxima) may represent times during which the user is most likely to be using the device. Valleys (local minima) may represent times during which the user is least likely to be using the device. The baseline interval can then be set based on the identified peaks and valleys. The height, or depth, and width of the peaks and valleys could be further used to specify the running time and the value of the baseline interval. For example, a baseline interval can be set proportional to the height or depth, of the corresponding peak or valley. The running time can be set proportional to the width of the peak or valley. If a peak is wide, then the running time of the baseline interval may be set to one hour, while a narrow peak may be set to a running time of 10 minutes.

In an embodiment, the usage patterns can be displayed visually to the user, either on the portable electronic device via the dashboard. The usage patterns can be displayed using various graphical and numerical representations. A numerical representation may consist of displaying one hour block periods, such as "1 pm-2 pm", with a number next to the block period specifying the corresponding average amount of activity. On the other hand, a visual representation may consist of a line plot, with the height of the line at a point in time representing the corresponding average amount of activity. The visualization of the usage patterns can also be used by the user or administrator to set baseline intervals and running times based on personal preference. The user activity and usage patterns can be further segmented by activity type. The user may then set the baseline interval based on the times of day of most text messaging user activity, while ignoring activity associated with phone calls. A battery life policy may also specify that only the peaks and valleys of one type of activity or a combination of user activities are to be used for such purposes. This would allow a user to define a battery life policy based on text messaging only, or text messaging and email, etc.

In an embodiment, the baseline interval can be reduced based on the remaining battery life of the portable electronic device. The baseline interval may be set to 30 seconds when the battery is at least half full. When the battery is less than half full, the baseline interval may be reduced to every minute or every two minutes, etc.

In yet another embodiment, usage patterns could be used to train a machine learning algorithm in order to automatically adjust the baseline interval and the running time of the baseline interval based on the usage patterns of the user. The machine learning algorithm could range from a simple decision tree to a support vector machine. For example, if using a decision tree, a branch of the decision tree may be: if the current time is 3 pm and if the device has not been engaged in safe mode for at least two hours, and if a call has been received in the last five minutes, then increase the baseline interval to 15 seconds for a period of 30 minutes. The day and time of day, along with the corresponding action or event at that point in time can be stored in a file. For example, an entry in the file can be: "10-04-09 14:00; incoming phone call; duration 10 minutes; driving false;". The first field specifies the exact date, the second field specifies the type of event or communication received, the third field specifies the duration of the event; and the last field specifies whether the device was engaged in safe mode at the time of the event. The information can be converted into a format suitable for training a machine learning algorithm, as is known in the art. For example, there may be a total of 20 possible events, for which receiving an incoming call is the fifth event. In that case the incoming phone call event can be represented by the number 5. The driving status of either true or false can be represented as 1 for true and 0 for false.

It will also be appreciated that features described herein may be subject to consumer activation. In other words, a consumer may be given the choice of having the speed or motion detection and/or response functions activated or otherwise enabled. For instance, a parent may purchase a pair of cell phones—one for himself/herself and one for his/her child.

The parent may activate the speed or motion detection and response functions with respect to his/her child's cell phone, but refrain from activating the functions with respect to his/her own cell phone. The cell phone manufacturer, service provider, parent, or other entity, may activate or otherwise enable the speed detection and response functions in the cell phone(s) accordingly. For example, a state may pass a law requiring all phones sold within that state to be equipped with safe driving technology and for the safe driving features to be activated when the phone is activated. Accordingly, as used herein, the term "consumer" shall be read to include, but not necessarily be limited to, a retail seller of a portable electronic device (20), a provider of services associated with a portable electronic device (20), a purchaser of a portable electronic device (20), a user of a portable electronic device (20), the parent or another person associated with a user of a portable electronic device (20), a manufacturer of a portable electronic device (20), etc.

In one embodiment, at least a portion of a safety circuit (40) of a portable electronic device (20) is subject to selective consumer activation and deactivation. In such embodiments, the selective activation/deactivation of at least a portion of the safety circuit (40) may provide selective activation/deactivation of one or more of the safety logic (42), the threshold logic (44), the speed or motion detection logic (50), and/or any other component. For ease of convenience in this specification, the speed or motion detection and the idea of detecting speed or some other type of motion will be referred to herein as speed detection, even though other types of motion could also be detected and utilized in the same manner as speed. In another embodiment, a consumer preference logic is present, and is configured to selectively override a signal communicated from and/or within the safety circuit (40). Still other logical and structural configurations for providing selective activation/deactivation of features described herein will be apparent to those of ordinary skill in the art.

Selective consumer activation/deactivation includes the ability to manually engage safe driving mode, to manually disengage safe driving mode, and to temporarily disengage safe driving mode for a period of time. Safe driving mode can be manually engaged and disengaged by selecting the corresponding safe driving application in the portable electronic device, by pressing a designated key in the portable electronic device, by pressing a soft key, by entering a code, by issuing a voice command, etc. A user may also be able to send a message or a request to a third party to allow the user to deactivate the safety circuit at a particular time, for a period of time, or in other circumstances. Options to disengage safe driving mode may be more accessible, such as by simply tapping the display screen of the portable electronic device, or pressing any key. Manually disengaging safe driving mode is useful for when the user is a passenger in a vehicle, a bus, a train, a plane, other methods of public transport, etc.

In an embodiment, the speed detection logic can also include logic for determining if the mobile device is in the position of a driver or a passenger in a car/truck or similar type of vehicle, or not in a vehicle on a roadway, such as a bus, train, ferry, boat, plane, etc. For example, through utilization of GPS data, a measurement could be made of the relative position of the mobile device from a centerline of a roadway upon which the vehicle was travelling. If the mobile device was within a certain threshold distance to the centerline, the mobile device would be assumed to be in the possession of a driver and if the mobile device was outside of the threshold distance, the mobile device would be assumed to in the possession of a passenger. Similar types of analysis could be performed on mobile devices that were determined to be moving, but not on roadways because the user was in a train, boat, ferry, plane, etc.

In an embodiment, safe driving mode may be temporarily disengaged for a period of time, such as for one minute, 5 minutes, etc. The temporary disengagement of the safe driving mode will be referred to herein as a snooze. The snooze feature can be accessible through a key, a soft key, to a tap of the display screen, to a voice command, or to a menu option. The snooze may also allow the user to complete one task, before enabling the safe driving mode again. For example, the user could press the snooze button and send one text message. After the text message was sent, then the safe driving mode would re-engage automatically. In an alternative embodiment, the duration time of the snooze feature is adjusted according to usage patterns. For example, if the user constantly activates the snooze feature, then the duration time of the snooze may be increased accordingly. Alternatively, the duration time may be reduced if the portable electronic device is only used for a small portion of the total duration time of the snooze.

The policy determining the selective activation of features described herein may further comprise the use of a code. For instance, a parent may use a code to activate the policy and features on a child's cell phone. Such a code may be used locally (e.g., input into the cell phone itself), remotely (e.g., submitted via a telephone to a service provider or via the Internet, etc.), or combinations thereof. It will also be appreciated that, regardless of whether a code is used to activate the features, a code may additionally or alternatively be required to de-activate the policy and/or features described herein.

In one embodiment, the policy, such as speed detection and/or response features described herein, may be provided by default with a portable electronic device (20), such that de-activation of those features is required in order to disable such features. In another embodiment, the policy described herein may be de-activated by default, such that activation of the features included in the policy is required in order to initially enable such features. In yet another embodiment, a consumer may be provided the option of selecting their own policy, such as selection from among a plurality of available features for activation and/or the option of otherwise configuring the provision of such features. For instance, a consumer may be given the option of selecting the type of response provided through the portable electronic device (20) when the speed has exceeded the threshold, a time period that must lapse with the speed above the threshold before a response is provided, the speed threshold itself, or any other configuration selection. Still other ways in which policies and features may be selectively configured, activated, and/or de-activated, including but not limited to code alternatives and methods of using the same, will be apparent to those of ordinary skill in the art.

Alternatively, portable electronic devices described herein may be provided with the speed detection and response functions enabled regardless of consumer preference for those functions. Accordingly, it will be appreciated that input indicating a consumer preference need not be permitted.

In another embodiment, an alert system is provided, either as part of a policy or separately. For instance, referring back to the parent-child example above, a system may be configured to provide an alert (e.g., e-mail, voice mail, text message, etc.) to the parent when it is detected that the child has started to drive (exceeded the target threshold), has stopped driving (exited the application or attempted to exit the application including exiting the application as a passenger) or has attempted to use the cell phone while traveling beyond the speed threshold. As another example, an alert or other indication that use of the portable electronic device (20) has been attempted while the speed is above the threshold may be recorded in a storage medium within the portable electronic device (20), in a storage medium remote from the portable electronic device (20) (e.g., a storage medium associated with a consumer), or elsewhere. In yet another embodiment, the user of the portable electronic device (20) is provided with an alert. For instance, where the portable electronic device (20) has a speaker or display screen, an alert may be provided through such an interface to inform the user that the portable electronic device (20) is not functioning normally due to the speed being above the threshold, etc. Other forms of alerts, recipients of alerts, and conditions for sending alerts are discussed below and others will be apparent to those of ordinary skill in the art.

In an embodiment, when a portable electronic device engages in safe mode, the behavior of the portable electronic device can be modified according to one or more safety policies. The safety policies consist of one or more rules and consumer preferences that specify how the behavior of the portable electronic device is to be modified when the device engages in safe mode. Safety policies also specify the triggers for engaging in safe mode, preferences for overriding the safe mode, and triggers for disengaging safe mode. This is in contrast to known attempts at controlling a portable electronic device while driving, which simply shut down the device completely or shut down completely certain functions of the device, without any auto-reply features, no user defined safety policies for controlling how the behavior of the mobile device is modified when in driving mode, and no user or administrator override.

Figure 3:
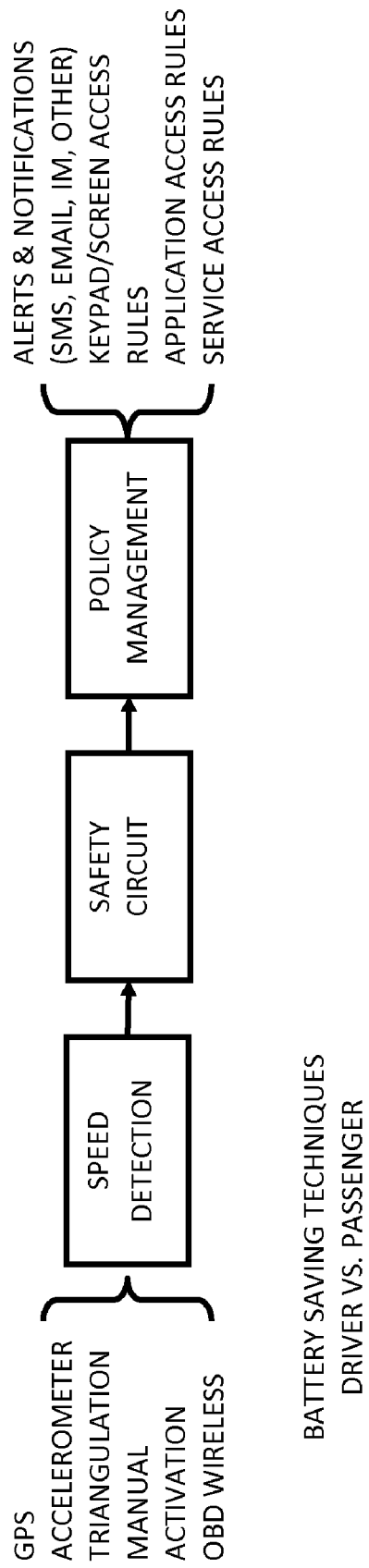
FIG. 3 is a high level view of an embodiment, illustrating the relationship between the speed detection logic, the safety circuit, and policy management.

FIG. 3 is a high level view of an embodiment, illustrating the relationship between the speed detection logic, the safety circuit, and the policy management system. Once the application is launched, various speed detection methods are used to determine the speed of the portable electronic device. The speed may be detected with any of the listed methods, using a combination of one or more methods, using a user preferred method, averaging the result from one or more methods, etc. Speed detection also depends on whether the user is driving or if the user is a passenger. If the user is a passenger, then the safe mode can be disabled manually, or it can be temporarily disabled with the snooze feature. As described more fully above, battery saving techniques also affect the way in which speed detection is carried out. For example, the battery saving technique can specify to only activate speed detection between certain periods of time, or to decrease or increase the frequency of speed detection based on usage patterns.

The speed calculated from the speed detection module is passed to the safety circuit. The safety circuit, in conjunction with the policy management system, determines the action to take based on a set of safety policies. A basic safety policy may consist of disabling all features of the portable electronic device when the speed is above a speed threshold for a period of time. An advanced safety policy may disable only text based communications, while allowing incoming calls only if a hands-free device is attached to the portable electronic device. Many additional variations are possible, such as disabling one or more features (phone, contacts, calendar, camera, mapping, games, etc.) among a plurality of features.

The preferences associated with the consumer input logic and safety policies, forming at least part of the policy management system, can be managed via an interface in the portable electronic device, via a web or a network based interface, or a combination of them. The interface can allow a user or an administrator to manage and monitor safe driving of a portable electronic device and policies associated therewith. The interface allows for various user management options, including the creation, deletion, and modification of policy settings. The interface may also support various levels of control. A basic level of control can be provided to individual consumers. This basic level of control can allow the consumer or user to provide account and profile information for applications or sites that the user may want modified or restricted when engaged in safe mode. For example, the user may enter information for an email account, so that when the device engages in safe mode emails received are stored without displaying an alert or are played to the user via audio by converting the email text to speech using a text to speech converter. The user in addition may enter profile information for social networking sites in order to enable the posting of status messages to the social networking sites when the device engages in safe mode. Examples of social networking sites for which status updates may be posted include FACEBOOK, MYSPACE, TWITTER, and LINKEDIN, among others.

The interface can also provide an administrator level of control to consumers or administrators managing more than one portable electronic device. For example, a parent may have administrative level of control to set safety policies and device preferences for the portable electronic devices of the family. The policies defined at the administrator level may be applied to one or more portable electronic devices, or to a specific portable electronic device. For instance, a company administrator may set policies for one or more portable electronic devices used by employees.

Other levels of controls may be defined. For example, an intermediate level of control may provide customization of policies, while the basic level of control may only provide the use of one or more predetermined default safety policies. From here on the on device, web or network based application or interface for user and administrator control will be referred to as a "dashboard".

The administrator level of control allows for the creation of users and groups, distribution of policies to users and groups, remote authorization of certain functions, and monitoring via remote user tracking. Policies may be assigned to single users or to a group of users. For example, an administrator could create a user, with a safety policy disabling all voice and text messaging functionality when in safe mode. Alternatively, the administrator could create a second user, with a second safety policy disabling only text messaging when in safe mode. A safety policy specifies the triggers for engaging the portable electronic device in safe mode, and a set of preferences for allowing a user to selectively override some of the disabled or modified features when in safe mode. For example, the administrator may specify that a portable electronic device is to engage in safe mode when the traveling speed of the device exceeds 30 miles per hour, with the user being able to selectively override the safe mode by entering a pin number. In an embodiment, the dashboard when accessed by an administrator can display a list of all existing users.

A new user could be created by providing basic information about the user, such as the name and other contact information. At a minimum, a new user could be identified by the number associated with the portable electronic device designated to the user. A group could be created by selecting one or more users and assigning them a unique group label, or by dragging one or more users into a box denoting the new group. Alternative graphical representations for denoting individual users and groups of users could be used as well. Users could be added and deleted from any group, groups could be renamed, and policies associated with a particular group may also be modified at any time by the administrator.

In an embodiment, the policies created for a group would override any preexisting policies associated with an individual user belonging to the group. The dashboard can also allow for exceptions for a specific user in a group. For example, a parent may create a group for all the children in the family and assign a single policy to the children group, but a geofencing notification may be assigned to the portable electronic device used by a child who has been grounded.

The dashboard can allow for remote authorization or denial of specific functions of a portable electronic device. For example, a policy may be created by an administrator which requires remote authorization of a selective override when a device is engaged in safe mode. For example, a user needing to make a call with the portable electronic device when engaged in safe mode may press a button that automatically sends a message to the administrator, informing the administrator of the override request. The administrator may allow the user to override the safe mode by accepting the request through the dashboard or deny the request as well. Requests can be approved or denied in other ways, such as email, text message or any other similar type of application or mechanism. A second user may request online access on the portable electronic device when the device is engaged in safe mode. The administrator could approve or disapprove such request remotely through the dashboard or other system. When a user requests the use of a function for which remote approval is required, the portable electronic device could display to the user a message stating that the function requested requires administrator approval. Alternatively, the device could play a recorded message, instead of displaying a message, in order to prevent the user from having to take his/her eyes off the road in order to look at the message displayed on the portable electronic device. A second message may also be displayed, or a recorded message played, to the user when the requested function is either approved or denied remotely by the administrator.

When remote authorization is requested, a message can be sent either to the device of the administrator or it could be delivered to an inbox that can be viewed through the dashboard. The message can be SMS, MMS, email, an instant message, or a combination of one or more of these, or a message format not yet developed.

The dashboard provides an administrator with monitoring of user via remote user tracking. Remote user tracking can provide information about the user of a portable electronic device in real-time or on request by the administrator. Remote user tracking in real time could display on the dashboard a set of information about a user based on the status of the portable electronic device, such as current location, current speed, start location, or target destination. This information could be updated on a regular time interval, such as every 30 seconds, every minute, or at some other predefined time interval. The information for all users currently engaged in safe mode may also be displayed through the dashboard. For example, if there are a total of 10 users, and only three users are currently driving with the portable electronic device engaged in safe mode, then the information for the three users could be displayed on a table with the status information updated regularly. Alternatively, a visual indicator for the current location of a user of the portable electronic device could be displayed on a map or on a third-party website, such as GOOGLE MAPS or YAHOO MAPS.

Remote user tracking could also provide a location or status update about a user by sending a ping or message to the user. For example, the administrator could select a user from a list of users, and send a text message, email, or some other type of query to the user. For example, the query could be a text message with the phrase "location". The receiving portable electronic device would receive the location or status update query, and respond with the current status of the portable electronic device, such as "123-456-7890 (First Name Last Name) is currently driving westbound on Route 7 in Vienna, Va." The message returned can also depend on the specific query sent to the portable electronic device. For example, the administrator could send a query consisting of the phrase "status," with the return message consisting of either "Driving" or "Not Driving" depending on whether the remote portable electronic device is engaged in safe mode. In an embodiment, the remote user tracking would be provided through the dashboard. In another embodiment, the administrator would be able to ping the remote portable electronic device by sending a message directly from the administrator's portable electronic device. In yet another embodiment, a second user may query the location or status of a first portable electronic device by sending a query. A privacy setting may be included when creating a safety policy, allowing a user to control under what circumstances and which contacts can query the location or status of the user.

In an embodiment, policy settings and preferences would allow users flexible control and a high degree of customization, allowing users to specify exactly how the behavior of the portable electronic device is modified when engaged in safe mode. Policies can be defined for safe driving mode functions, speed triggers, telephony functions, SMS/MMS, email, instant messaging, third party applications, contacts, voice portal control, exit/passenger mode or selective overrides, remote authorization, remote status updates and queries, and administrative notifications and alerts.

Policies for safe driving mode functions allow for configuration of keypad access, audible announcements, alerts and notifications sent to contacts based on various triggers or conditions, and status updates of social networks and third-party applications. Alerts and notifications can be sent to contacts via SMS, email, or instant messaging. Status updates can be posted on various public or private social networks, including FACEBOOK, TWITTER, MYSPACE, and LINKED-IN. The notifications, alerts, and status updates can be sent when the user starts safe driving; when the user stops safe driving, either because the vehicle came to a stop or because of selective override; when the user reaches a location specific trigger or based on geofencing; or based on some other policy customization.

The dashboard may allow a user to designate a virtual perimeter using geofencing. For example, a parent could designate a virtual perimeter around certain areas in the city, so that if the parent's child were to drive outside of the city beyond the virtual perimeter it would generate and send a notification to the portable electronic device of the parent. Geofencing is well known in the art and could be implemented using GPS technology and could be provided by third-party applications.

Message customization through the dashboard allows a user or administrator to customize the types of messages or updates sent to contacts depending on one or more conditions. The format and content included in messages sent to contacts may also be configured. The user or administrator may also record voice messages, or write the content of status updates sent to contacts. In an embodiment, when the mobile device enters safe mode, a message could be sent to a set of contacts informing them that the user is busy driving and including a link to a third-party website where the contacts could view the exact location of the user. The mapping function could also be disabled to maintain privacy. The user may also choose to include advertising or sponsorship information on the message. For example, if the portable device is owned by a company, but being used by an employee, then messages or call attempts made to the employee while the employee's portable device is in safe mode could send messages including advertising information of the company along with the status update.

The safety policy or policies manage access to communication functions, and other functions provided by the device or provided across the network. The safety policy control can be exercised internally by the software on the portable electronic device, or it can be distributed across the device and the network, or only on the network. For example, if the device engaged in safe mode and the safety policy control is exercised on the network only, then a message could be sent to a remote server, which would then tag the mobile device as being in safe driving mode. This can consequently trigger a lookup for the corresponding safety policy, in order to handle all incoming communications and outgoing communications according to the user's preference. If the mobile device is called by another party, then the corresponding action can be taken first on the network side before it even reaches the mobile device. For example, if a user has designated all calls to be blocked except for the priority contacts, then calls from non-priority contacts would be suppressed on the network side, delivering the calls only after a message is received on the server or network that the mobile device has exited safe driving mode.

In another embodiment, control of the safety policy could be exercised on the portable electronic device. For example, if all alerts associated with voice and text communications are to be suppressed, then the portable electronic device could store records of the voice and text communications locally on the device, without playing any alerts to the user, delivering the corresponding alerts only after the device has exited safe driving mode.

Figure 4:
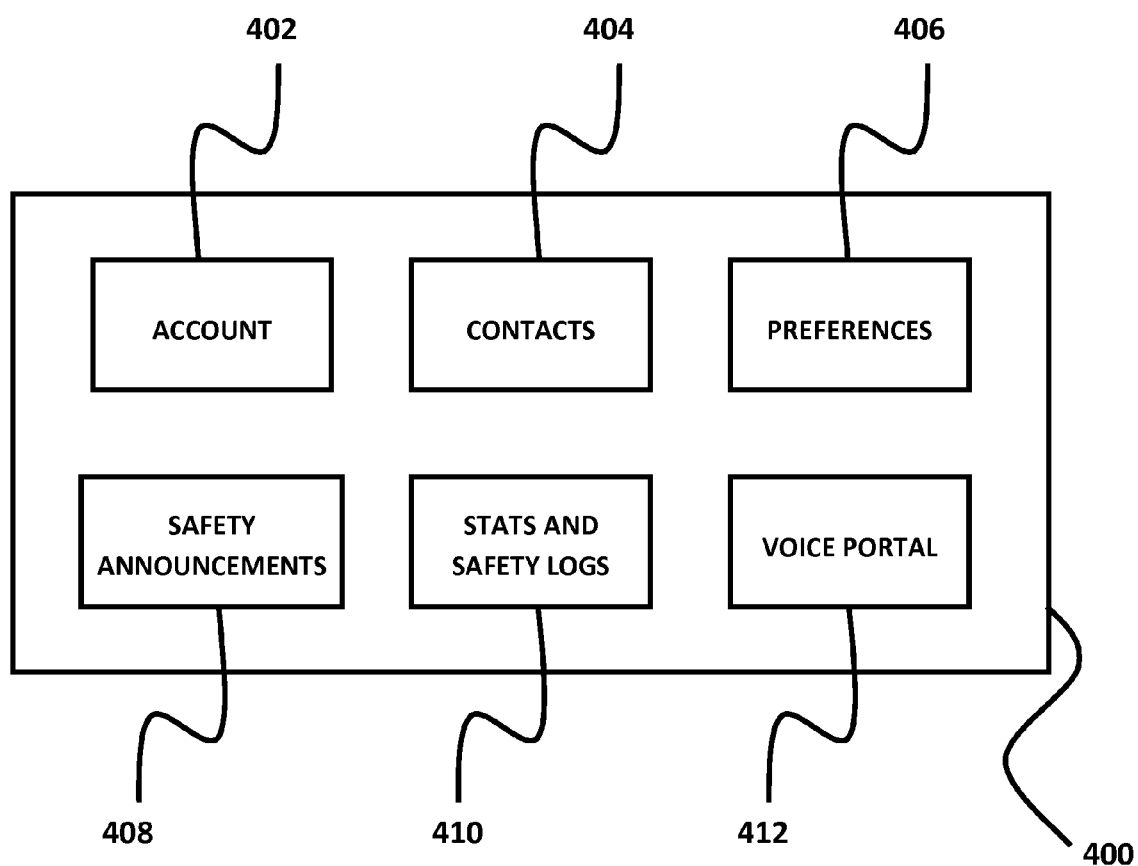
FIG. 4 illustrates an embodiment of the dashboard interface.

FIG. 4 illustrates an embodiment of the dashboard 400, consisting of menu options account management 402, contacts 404, preferences 406, safety announcements 408, stats and safety log 410, and voice services 412. Account management 402 provides users with options to manage personal information, including the primary mobile number, contact information, password information, etc. Contacts 404 includes options for adding new contacts, deleting contacts, editing contact information, assigning contacts to a priority group or to a user defined group, recording call ringers, and assigning a call ringer to a contact or group. Preferences 406 allow users to specify how to modify the behavior of the portable electronic device when engaged in safe mode. Safety announcements 408 provide configuration options for audio safety announcements, which can be played when the portable electronic device engages in safe mode, or played in response to other user defined events. Stats and safety logs 410 allow a user to view and analyze usage patterns. In the case of consumer/administrator use, or a user having control over other devices (such as the parents in a family), usage patterns for other users can be viewed.

Voice portal 412 provides a set of voice-based services and allows the user to set configuration options related to the set of voice services, which allow a user to use and control the portable electronic device via voice commands while engaged in safe mode. Voice services may include the ability to have text or email read to the user while in safe driving mode, as previously described, but could also include services, such an enabling a user to respond to and create text, email and other types of message, regardless of whether those voice services are enabled directly on the portable electronic device, enabled through the network connected to the device, or spread across both the network and the device in some manner. As with other types of features and functions described herein, the voice service could also be subject to policy controls.

Figure 5:
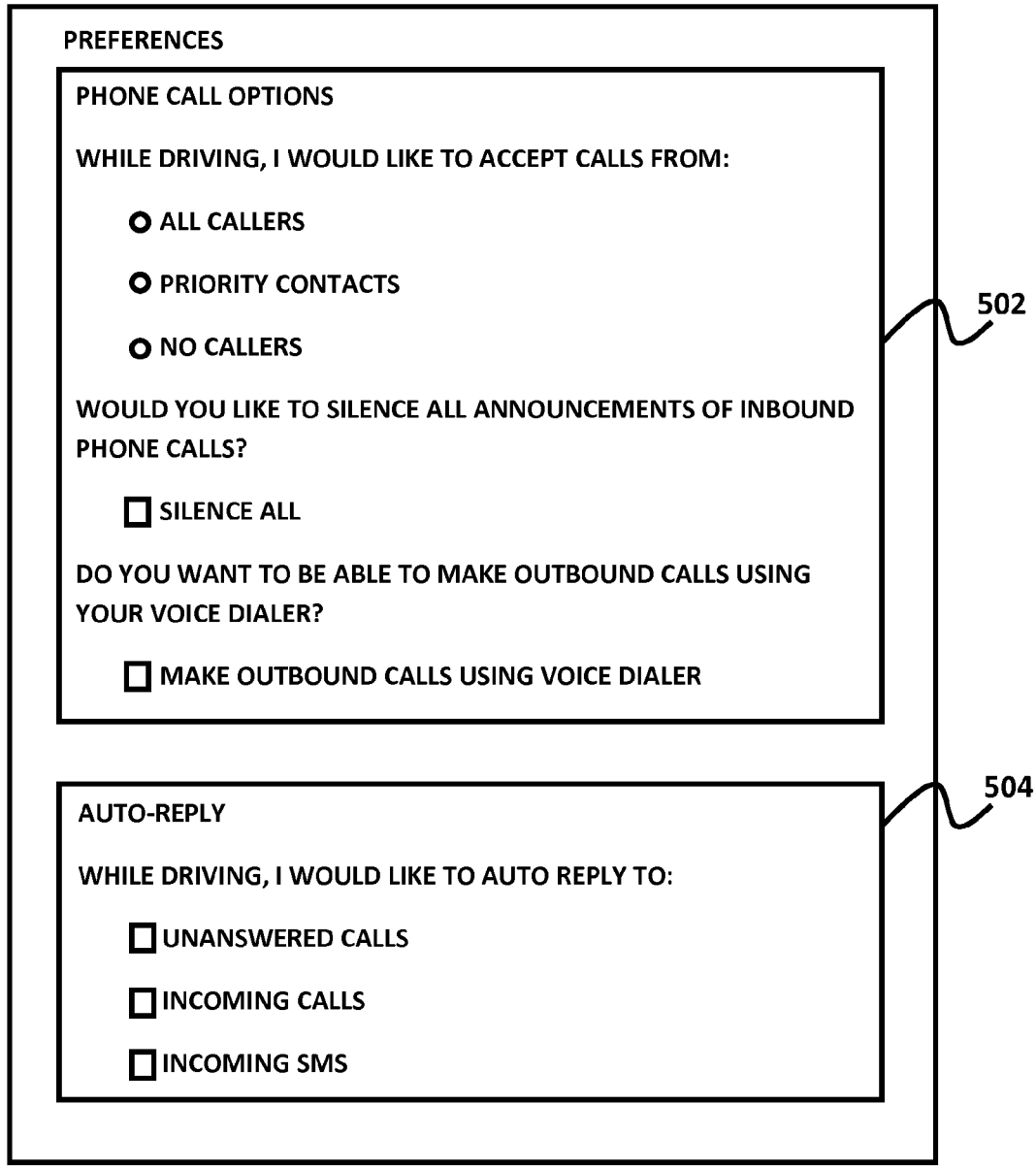
FIG. 5 illustrates options for preferences accessible through the dashboard interface in accordance with an embodiment.

FIG. 5 illustrates an embodiment of the preferences panel 406 available through the dashboard 400. The preferences panel 406 includes phone call options 502 and auto-reply options 504. With the phone call options 502 the user can specify from who to accept calls, whether to silence all announcements of inbound phone calls, and whether to enable outbound calling using a voice dialer or an alternative hands-free interface. The auto-reply options 504 allow the user to specify whether to auto-reply unanswered calls, to incoming calls, to incoming text messages, or to do a combination of these. While not illustrated in FIG. 5, other auto-reply options can include customization of content in auto-reply messages, and the assignment of custom auto-reply messages to contacts or a group. The preferences panel can also be expanded by adding options enabling users to define highly customized safety policies.

FIG. 6 illustrates an embodiment of driving options available through the preferences panel 406. Driving options allow the user to specify actions to be executed when the portable electronic device engages in safe mode and when it exits safe mode. For example, the user can specify the portable electronic device to be set to an operating mode after exiting safe driving mode. The operating mode can include normal mode, vibrate mode, loud mode, quiet mode, phone mode, or off. The user can also specify whether the portable electronic device should engage in safe mode manually or automatically using speed detection. Driving options further enable the user to configure how priority contacts are notified of status updates while the user is driving. Messages or status updates can also be automatically sent to social networking sites, such as TWITTER or FACEBOOK. To enable driving status updates in social networking sites, the user can enter the corresponding account information for each supported social networking account. In an embodiment, the user can enter a digital identity, such as OPENID, and status updates would be automatically posted to the corresponding sites.

Figure 7:
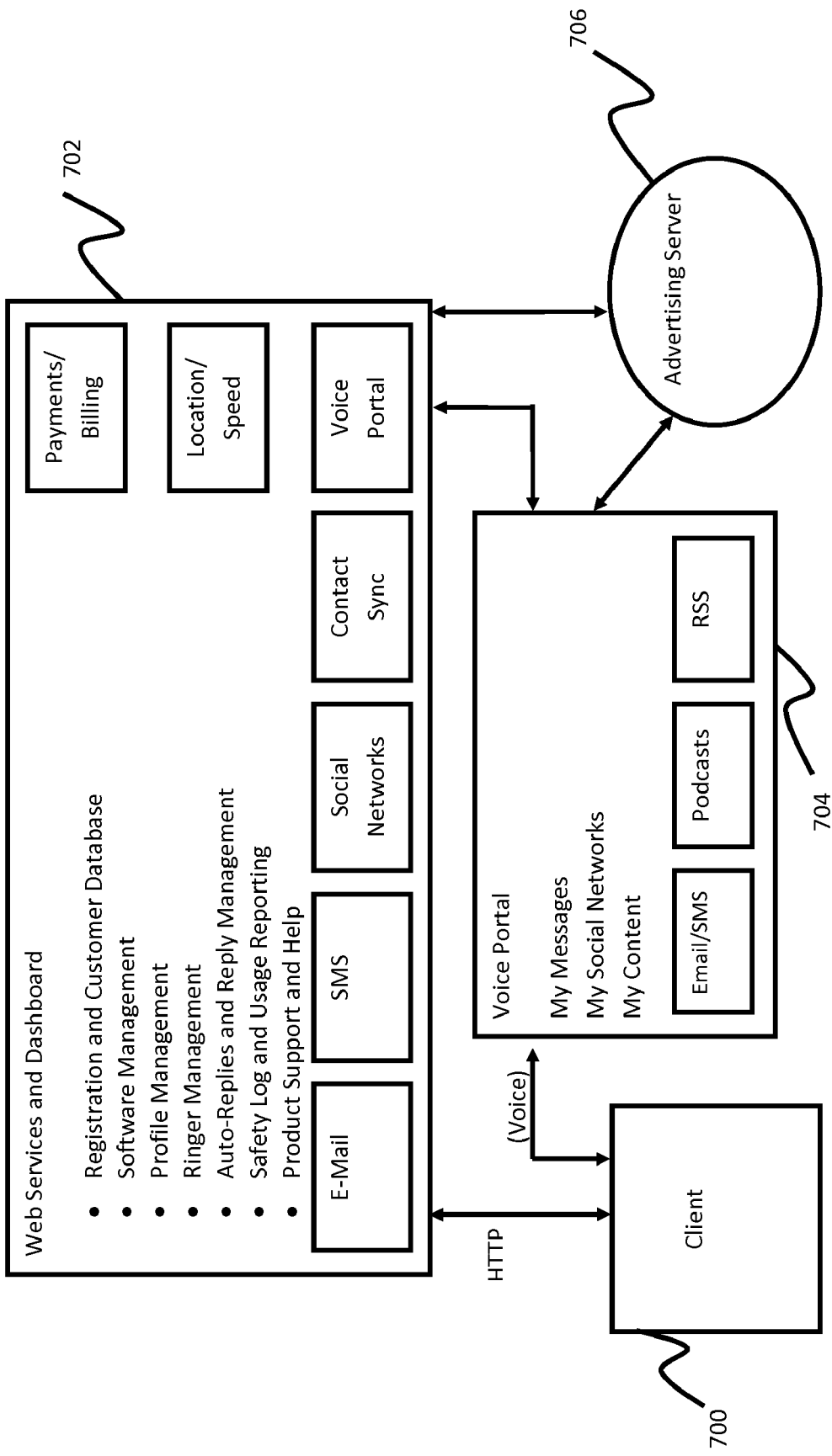
FIG. 7 is an architectural diagram of the system in accordance with an embodiment.

FIG. 7 illustrates a high level architecture of an embodiment, consisting of the main components and their relationships. The client 700 consists of the portable electronic device. The client 700 may access the web services and dashboard 702 via an HTTP connection. Alternatively, the web services and dashboard 702 may be accessed via an HTTP connection using a device or system other than the client 700. In addition, the client 700 has access to a set of voice services 704.

The web services and dashboard 702 consist of the interface enabling the user to control all aspects related to policies and allows the user to manage his/her account information. Services accessible through the dashboard 702 include a registration and customer database, software management, profile management, ringer management, auto-replies and reply management, safety log and usage reporting, product support, and help. As previously described herein, the dashboard 702 also allows the user to manage the triggers for engaging in safe driving mode, how the client behaves when engaged in safe mode, and when it exits safe mode. If the user receives email on the portable electronic device, then through the dashboard the email account information can be provided, enabling auto-replies to be sent to contacts who send email to the user while driving. Other configurations include email response preferences, SMS response preferences, account information for social networks, preferences related to status messages in social networks, status updates to instant messaging accounts, syncing of contacts with external email applications or other contact management software, voice services management, preferences related to triggers for location or speed, etc. In addition, if the user pays for the safe driving service, then the dashboard enables users to manage payments and billing related to the safe driving service.

The set of voice services 704 allow the user to manage messages received, to manage status updates posted to social networks, and other media content. The set of voice services allows a user to listen to incoming email and SMS messages, and to respond accordingly using voice commands. In an embodiment, a user may listen to podcasts or RSS feeds using voice commands as well.

The advertising server 706 interacts with the web services and dashboard 702 by providing advertising content sent to the client 700 according to the preferences and policies defined. The advertising server may also communicate with the set of voice services 704 in order to deliver audio advertisements to the client 700 while actively using the voice services 704.

An embodiment restricts keypad access while in safe mode. In an embodiment, keypad access would be disabled by ignoring all key presses while the portable device is in safe mode. Alternatively, keypad access may be restricted to one or more convenience keys, soft keys, or on-screen buttons. In an embodiment, keypad access would be enabled by simply touching the screen of the mobile device if the device has touch screen support. Keypad access may also be restricted to numeric access only, so that a user could still dial numbers but not be allowed to do text messaging, email, or instant messaging. This could be further restricted by having context sensitive menus in the device when the device is in safe mode, and only list available functions in the menus of the device. Numeric access could be further restricted by allowing the user to only dial emergency numbers such as 911, or other convenience numbers such as 411. Also, the user may only be allowed to dial numbers to a specified group of contacts. The keypad access restriction may be configurable by the user or by the administrator through a safety policy.

Audible announcements consist of notifications given to a user or consumer of a portable electronic device via audible cues in response to one or more events or triggers. Through the dashboard a user can select the audible announcements from a pre-recorded list by default by the dashboard in response to certain triggers or events. Alternatively, the user or administrator may custom record audible announcements to be associated with certain triggers or events. In an embodiment, a list of possible events or triggers would be displayed on the dashboard. A user would be able to assign a specific audible announcement for each listed event. The announcements can be emitted based on a variety of events, such as when the mobile device enters safe mode and when it exits safe mode, when the device reaches a specific location, or when a boundary of geofencing is encountered.

The device could also emit an audible announcement based on proximity marketing depending on the location of the portable device. For example, if a user drives past a restaurant, the user could receive an announcement on the portable device regarding the daily specials at the restaurant. The proximity marketing announcements could be delivered to the user in email, SMS, MMS, or in an alternative format. The proximity marketing announcements, if consisting of text, can be converted from text to speech, so that the content could be played via audio to the user. Alternatively, the marketing announcements may simply consist of an audio file which can be played to the user via audio. The audible announcements could also provide the user with speed reminders above specified thresholds. For example, if the user has been driving over 70 miles per hour for at least five minutes, then an audible announcement could inform the user that he or she is exceeding a moderate speed limit.

Custom audible announcements could also be associated with specific message types received by the portable electronic device when in safe mode. The audible announcements could also be contact specific. For example, if a text message is received from a first contact when the device is in safe mode, the device could emit a first audible announcement. If a text message is received by a second contact, then a custom message recorded by the user could play, such as "Text message from Mike." Other voice-based services could also be trigged in a similar manner, such as playing a customer announcement that applies to the sender of a message, and then follows with the reading of the message. Likewise, the user could direct that a custom message, or even standard message, be sent to another party through voice direction. These and further audible announcement options may be customized by the user or administrator or be a default setting of the application.

In an embodiment, a set consisting of one or more thresholds which trigger the portable device to engage in safe mode and to exit safe mode may be customized with a safety policy through the dashboard. The triggers can be associated with certain speeds. For example, the device may engage in safe mode when the speed of the portable device exceeds 30 miles per hour. The device may also engage in safe mode when the speed of the portable device exceeds 40 miles per hour for at least 2 minutes. The device may also be configured to engage in safe mode based on the current day and time. For example, the device may be set to engage in safe mode between the times of 7:30 am and 8:30 am and 4:30 pm and 5:30 pm, during the regular commuting times of the user of the mobile device.

The dashboard may provide speed, timer, and date controls to define triggers and thresholds. For example, a calendar and clock view would enable a user to specify days and times of day during which the device should automatically engage in safe mode. A speed view may allow a user to enter a number specifying the speed limit to use as the speed threshold. The user may also enter an amount of time, or simply slide a slider, which represents the amount of time that a traveling speed of the device must be over the threshold in order to engage in safe mode. Other views and controls may also be provided that allow the user to specify the various triggers and thresholds for engaging in safe mode and exiting safe mode.

Policy settings can allow a user to customize the behavior of telephony functions of the portable electronic device when engaged in safe mode. In an embodiment, the duration of received calls may be limited to a time amount (referred to as a time limit or a safe mode call time limit), such as 30 seconds, one minute, two minutes, or some other predetermined time interval. As noted above, the frequency of calls may also be limited to an amount, such as a total of two calls allowed while the device is in safe mode. This call frequency limit would prevent a user from doing multiple short calls in order to circumvent the portable device being in safe mode. The dashboard can also provide customization of other telephony features based on a set of policies including outgoing and incoming phone call management, and customization of auto-reply and responses. Auto-reply and response messages can also be customized for other types of communication including SMS, MMS, email, and instant messaging.

The dashboard allows a user to manage incoming and outgoing phone call management. For example, the user can designate a safety policy which blocks all outbound voice communications except to a set of emergency numbers, such as 911. A set or pre-programmed numbers can also be associated with soft keys, convenience keys, or on-screen buttons when the device is in safe mode. Voice activated dialing may also be supported by pressing a specific key or having a specific word uttered by the user. For example, the user could utter the voice command "Dial" or "Help" or "Information" and this would allow for the user to dial to a set of numbers such as a spoken number, 911, 411, or other preset number such as the user's home number, the office number, or for one or more priority contacts. Alternatively, the voice command to dial could allow the user to dial any number via the voice portal, further described herein.

All incoming communications to the portable electronic device are managed as a matter of a safety policy including phone calls, push-to-talk, instant messaging, WAP push, SMS, MMS, email, as well as local reminders and alerts from applications such as tasks lists, calendars, among others. For example, a safety policy may configure the portable electronic device to forward all calls to voice mail, to automatically answer calls received based on a number of rings, or answer incoming calls based on a specific voice command, such as "Answer." The user may also specify through the dashboard a set of contacts from which calls are allowed while the mobile device is in safe mode. For example, the user may allow calls from all contacts in the user's address book or from a specific group of contacts. The safety policy can also be configured to allow the user to answer the mobile device using a hands-free interface. Incoming phone call management may allow the user to specify audible announcements associated with calls and other communications. The user can select an audible announcement from a list of available audio announcements. For example, an audible announcement could play a message informing the user of an incoming call, such as "Call from Mike." Alternatively, when receiving a text message, the audible announcement could play "Text message has been received and will be saved." The audible announcements can be selected by default or custom recorded by the user for a specific contact or for a group of contacts, or for the type of communication received. A first audible announcement could be used when receiving a voice communication and a second audible announcement could be used when receiving a text message.

In an embodiment, the dashboard may allow the user to configure policies and preferences specific to third party applications. For example, a user may provide account information for social networking sites in order to post automatic status messages when the user's portable electronic device is in safe mode. The user may also configure the behavior of third-party applications when in safe mode. For example, a user may disable appointment alerts for a calendar application when in safe mode. In the same context, the dashboard policies can be configured to permit certain pre-determined applications to work when in safe driving mode.

Safety policies related to contacts can allow a user or administrator to specify priorities for a specific group of contacts, including behavior for handling for calls, email, SMS, instant messaging, or other types of media and communication. Policies for contacts would include the setting of customized ring tones or other types of announcements, notifications and alerts for a specific contact, for a group of contacts, or for other numbers. The ring tones may be a default or a downloaded tune, or it can be a recorded message by the user. For example, the user could assign one or more contacts to a family group, and record a voice message stating "Call from family" when a call from a member of the family group is received while engaged in safe mode. The contact policy may also include a set of rules specifying when and how often to send notifications to one or more contacts when in safe driving mode. For example, the user may specify a policy to send a notification when the device engages in safe driving mode and when it exits the safe mode. The user may also enable auto-reply to communications received while in safe mode. Further, if auto-reply is enabled the dashboard provides options to edit the content of the messages sent as auto responses.

The content of the messages can be edited by typing a message into a textbox, by selecting a message from a list of available messages, or by recording a voice message. The user may also specify one or more fields of information which should be sent to the one or more contacts as status updates. For example, the user may specify that status messages include only the current speed and a link to a map on a third-party website showing the current location of the user. The user may further customize how the user's location is shared with contacts or other calling parties. For example, all information available with respect to the user's current location may be shared with contacts from the address book or with a specific group of contacts, whereas a less descriptive message would be shared with calling parties who are not in the user's address book or which do not belong to a group having the proper access permissions.

Policies may also be used to invoke a set of voice-based services that would allow the user to interact with the phone and other services using voice commands. The voice services include text to speech (the reading of messages), speech to text (dictation and transcription of messages), and command control (utterance of certain words to manage the device or application tasks). These voice services can be local to the device or remote or a combination of both. The voice-based services consist of modules that allow the user to control a set of device functions via voice commands. The voice services policies allow the user to define access to applications, services and content via voice commands, and to customize the specific voice commands used respectively.

The exit or passenger mode policies allow the user to specify the selective override, and how to exit into passenger mode when the device is engaged in safe driving mode. The policy options include allowing for passenger mode, never allowing for passenger mode, allowing access to passenger mode by remote authorization, and requiring the use of a password in order to exit to passenger mode.

Policies for remote authorization allow a user or administrator to specify which users or group of users require remote authorization. Policies may specify the function or group of functions on the portable electronic device which require remote authorization. For example, a policy may prevent all text messaging while in safe mode and that policy cannot be overridden by the user, but remote authorization could be used to override the policy.

The dashboard may provide control of notifications and alerts sent to the administrator in response to one or more events defined by a policy. Notifications and alerts may be specified for a variety of events, including geofencing and other location specific triggers, alerts based on speed thresholds, and notifications or alerts based on a driving curfew, such as the time of day or day of week. For example, a parent may set a time of day for a driving curfew, while an administrator for a company may specify a day of week curfew on a portable electronic device owned by the company. The administrative alerts and notifications can be received by the administrator in an inbox on the dashboard or as a message on the administrator's portable electronic device.

In an embodiment, a set of a predetermined operating modes/templates or policy settings would be available for use, such as "safe," "safer," and "safest." The safe operating mode allows for voice communication only, including the use of the voice portal for voice commands. The safer operating mode allows the user to set policies for certain features of the device. The safest operating mode would disable all communications with the mobile device, although certain exceptions might be allowed. Alternatively, the user may configure each of the operating modes or define a new operating mode by modifying one of the predetermined operating modes based on the user's needs. For example, a user may like the safe operating mode, but may want to disable the use of the voice portal for text messaging. In the preferred embodiment, the user can selectively override the operating mode by entering a password or code.

The dashboard allows an administrator to distribute a set of policies remotely to a single user or a group of users. In an embodiment, the administrator would distribute the safe driving application, customized according to a set of policies, and other associated files to one or more portable electronic devices through the dashboard. Once a set of policies have been defined, and a group of users has been selected, the administrator could select a distribute button or menu time, which sends a message to all of the corresponding users. The message would be received by the users on their corresponding portable electronic device, the message including a link allowing the users to download the application with a set policy. Alternatively, the message could be received directly by the device, without requiring any user interaction, and a set of instructions within the message can instruct the portable electronic device to change or update the local safety policy and related configuration parameters.

In an embodiment, the dashboard allows the administrator to monitor all safe driving mode activity. The driving activity of one or more designated users may be periodically uploaded to a remote server or to the network and saved to a safety log accessible through the dashboard by the administrator. The safety log may consist of safety event entries in a simple text file, viewable over the dashboard. Entries in the safety log may include the day and time when a portable electronic device engaged in safe mode, then the device exited safe mode, functions used on the device when engaged in safe mode, and overrides. The safety log could also contain phone numbers called or calling, types of events that were averted while in safe mode, calls attempted to be made or actually made to or from the device and the length of such calls while in safe mode, and many other operational aspects of the device while in safe mode. Alternatively, the administrator may define additional events that generate an entry stored in the safety log. For example, the administrator may be interested in text messaging use while engaged in safe mode. The administrator may specify that whenever a text message is received on a portable electronic device engaged in safe mode, an entry in the safety log will be generated containing the day and time of receipt and the sender's contact information.

The safety log may be stored in a database or in a text or XML file and displayed through the dashboard using various graphical representations. For example, the safety log may be organized by group, by each contact, or by the type of event, and presented through the dashboard on a tabular form. The safety log could be available for download to a local storage device.

In an embodiment, an audio message is played when the portable electronic device engages in safe mode. The message played can be selected by the user from a predetermined list of messages or it can be custom recorded by the user, with the corresponding options available through the dashboard. For example, the message may remind the user to be safe, or it may state "Device has engaged in safe mode, all alerts will be suppressed." In an embodiment, a message would be immediately sent to a set of contacts when the portable electronic device engages in safe mode, with the set of contacts possibly being friends, family, or belonging to another group defined and customized by the user through the dashboard. A message or status update may also be posted to one or more third-party sites, including social networking sites. The message sent to select contacts can be sent via SMS, MMS, email, or by sending an instant message to one or more contacts. The instant messaging status of the user may also be changed to "Busy," "Driving," or to another user defined status message.

The activation of safe driving mode can also change the network-based ring-back tone. The voice mail greeting can also be changed in order to inform callers that the user is busy driving.

While in safe driving mode, third-party applications running locally on the portable electronic device or running remotely would be sent a notification to make these third-party applications "safe driving aware." For example, if the user has a calendar application on the device, then the calendar application would be notified of the driving status, enabling the calendar application to suppress any appointment alerts until the end of the safe driving mode. Through the dashboard or via an API directly in the application, the user may further customize how to modify the behavior of third-party applications when engaged in safe driving mode, ranging from completely disabling a third-party application, to a simple modification of the behavior of the third-party application.

The voice portal allows for the control of a set of functions of the portable electronic device via voice commands. The voice services include text to speech (the reading of messages), speech to text (dictation and transcription of messages), and command control (utterance of certain words to manage the device or application tasks). The voice commands can allow a user to send text messages, send emails, respond to instant messages, and post status updates to third party websites such as social networking sites. The voice portal can include support for calls to 411, 911, and other specified numbers by the user. Responding to SMS, email, and instant messages via voice based services can be supported by allowing the user to record a voice message and sending the message via MMS to the caller or sender of the message. The recorded voice response by the user can be attached to the message sent to the original caller or sender, or a link could be provided that redirects the original caller or sender to a website where the recorded voice response can be played. The voice commands can allow a user to listen to text based communication using a text to speech converter, including text and email messages, and instant messages. The voice command can also be customized to support access to other functions of the portable electronic device or be integrated with third party applications running locally on the device or remotely. The use of text to speech converters is well known in the art.

In an embodiment, when the device receives an incoming SMS or other text based communication, and based on policy, an audible alert would be played for the user notifying them of such message and either automatically, via a voice command or through a key press, a voice service (either local or in the network) would be triggered that would enable the user to listen and respond to the message. Assuming the user can receive the message per the current safety policy, the user will hear a message. For example, the user may hear: "Mike you have a new text message," followed by a set of options enabling the user to listen to the message, respond to the message, listen to other messages in the inbox, etc. The text message will still be on the device when the user returns to standard mode. The same sequence would apply for other communication types such as an MMS, email, or instant message.

In an embodiment, the incoming call information could be played to the user using a text to speech converter. The user may assign a priority to contacts, allowing incoming communications from said contacts to be played to the user via audible announcements. Alternatively, the user may specify that all incoming communication to be received and played to the user with audible announcement. The text to speech converter could announce the information displayed by the caller line identification, including the name and phone number of the calling party. For example, if the incoming call is from a priority contact, the text to speech converter could announce "Call from Mike," where "Mike" is the name in the user's address book associated with the contact making the call. Alternatively, if the only available information is a phone number, then the text to speech converter could play a message stating "Call from number 123-4567." Incoming calls received while the mobile device is in safe mode may also be suppressed until the mobile device has exited safe mode. When the incoming call is received, a message may be automatically sent to the calling party informing the calling party that the user received the call but is busy driving. The message may be sent via email, SMS, instant messaging, or it can be a message recorded by the user.

In an embodiment, sending messages via SMS, MMS, or email via the keypad would be disabled. However, this may be controlled via a safety policy. The user can assign a set of contacts or a group to be priority or non-priority. Priority and non-priority groups may be given different access privileges to contacting the user while the user's portable electronic device is engaged in safe mode. The user may define further priority levels, such as high priority, medium priority, low priority, etc. Messages from non-priority contacts may land quietly on the portable device, with an auto-response sent to the sending party. In yet another embodiment, text messaging may be supported with voice commands via the voice portal or through a hands-free interface. For example, the voice commands would allow the user to listen to a received message by having a text to speech converter convert the text message into an audio file that can be played to the user. Voice commands may also be used to respond to messages received. When a message is received, an audible notification may also be played to the user if the message was sent by a contact belonging to a priority contact.

Instant messaging while the portable electronic device is in safe mode would change the status of the user to "Driving," "Busy," "Away," or some other custom message written by the user. Instant messaging may be disabled by locking the keypad. Alternatively, instant messages received from non-priority contacts may land quietly on the portable device, with auto-responses sent to the sender party informing that the user is busy driving. In an embodiment, voice commands would allow the user to listen to incoming instant messages, using a text to speech converter, and respond to the instant messages. If a priority instant message was received, then the device could play an audible notification to the user informing of the message received. The outright blocking of instant messaging may only be overridden by an administrator or remote authorizer, as noted above, or overridden by the user, depending on different circumstances.

In an embodiment, parties interested in reaching a user who is busy driving may assign a priority to the message sent or the call being made. For example, a contact may send a text message or an email to the user, assigning a high priority to the message. Alternatively, when placing a call an extra digit could be pressed in order to indicate that the call should be considered of high priority. An audible notification could be played to the user when a high priority message or call is received. For example, the message could play "A high priority message has been received from Mike," or "A high priority message has been received from number 123-4567." This would inform the user that an urgent message or call was received. In an embodiment, the number of high priority messages or calls received by a portable electronic device while engaged in safe driving mode would be limited by a priority message limit or a priority call limit. This would prevent users from circumventing the safe mode of the mobile device by always receiving calls and messages marked as high priority. This would also prevent calling parties or parties sending a message to a driving user from assigning a high priority to every call or message sent in order to ensure that the driving user receives the call or message immediately.

A key in an embodiment relates to not only modifying the behavior of standard features of a mobile when in safe driving mode, but also the ability to allow third-party applications installed on the portable electronic device to be driving aware. Notifications can be sent to all or to a select set of third-party applications running locally on the portable electronic device or running remotely. The manner in which each third party application uses the driving aware information will depend on the type of third-party application and functions provided by the third-party application. In an embodiment, all alerts associated with third-party applications would be suppressed. For example, alerts for a task or a calendar application would be suppressed until exiting safe driving mode. Alternatively, alerts generated by third-party applications can be voice enhanced. For example, text alerts can be converted to audible announcements using a text to speech converter. The use of voice commands can also be used to manage the third party applications, if supported. A predefined set of voice commands may be used to access specific third-party applications, or to access a subset of functionality within those third-party applications. For example, if the user was interested in using a navigation application, the user could say the command "Navigation" and this could start the corresponding application, providing audio feedback of the user's current location. The enhancement and modification of the behavior of third-party applications when engaged in safe driving mode can be customized via the dashboard.

The access to third party applications while in safe driving mode could also be based on soft keys, convenience keys, or an on-screen button. In another embodiment, a set of application programming interfaces (APIs) could be provided for use by third-party applications. Third party applications can use the set of APIs to interface with the safety circuit/logic/policy or dashboard in order to obtain driving information and the preferences of the safety policy. For example, the API can include query calls for getting the current traveling speed, getting the average traveling speed for the last 10 minutes, getting contact information for calls received while the device is in driving mode, getting the current safety policy, etc.

Figure 8:
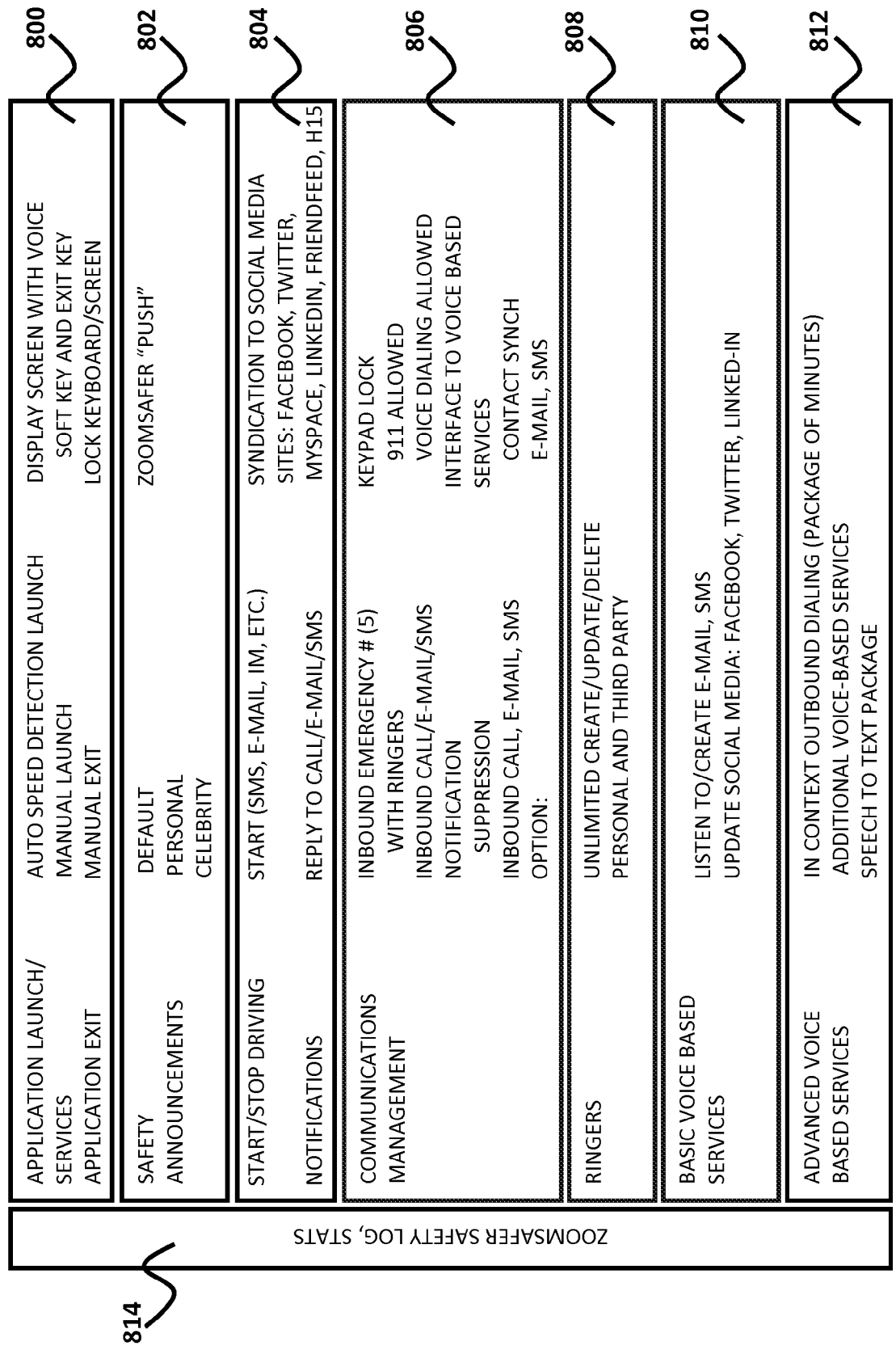
FIG. 8 illustrates a portable electronic device product stack in accordance with an embodiment.

FIG. 8 illustrates a production product stack for a portable electronic device such as a smart phone. The basic set of services provided consist of application launch and application exit 800. These services include features such as auto speed detection launch, manual launch, manual exit, display screen with voice services soft key and exit key, and lock keyboard or screen. Safety announcements 802 make up the next level of the product stack. Safety announcements include a set of announcements included by default with the application, personal announcements recorded by the user, celebrity announcements consisting of announcements made by a plurality of celebrities, and ZoomSafer "Push". ZoomPush is the ability to push audio files and other types of files to the device, which are then played or activated based on specific triggers, such as starting to drive. This permits the administrator, consumer, carrier or software providers to create their own unique messages and other communications and have them played or activated on the device, even though the user did not create or request them.

Start/stop driving notifications 804 include start notifications, which send an SMS, email, IM, or other multimedia message to a set of contacts when the portable electronic device engages in safe mode. Notifications also include auto-replies to received calls, emails, and SMS. Stop notifications can be configured similarly to the start notifications, informing a set of contacts that the user has reached his/her destination. Notifications are also sent to social media sites including FACEBOOK, TWITTER, MYSPACE, LINKED-IN, FRIENDFEED, H15, etc.

The communications management layer 806 controls behavior of the portable electronic device for handling inbound communications, keypad lock, enabling calls to emergency numbers, allowing for calls with voice dialing. These features include handling of inbound emergency calls, and the interface to the voice services. The ringers layer 808 includes the functionality to create, update, and delete ringers. The ringers can be created by the user or the user may use a third party ringer.

The basic voice based services layer 810 consists of the core functionality allowing users to listen and create messages via voice commands. The core functionality also includes the ability to update social media. The advanced voice based services layer 812 extends the advanced voice based services. The additional features include in-context outbound dialing, and other additional voice-based services, such as controlling third-party applications via voice commands. The advanced voice services include text to speech (the reading of messages), speech to text (dictation and transcription of messages), and command control (utterance of certain words to manage the device or application tasks).

All of the layers communicate with the safety log 814 which keeps track of all activity when engaged in safe driving mode. The safety log can also track usage patterns.

Figure 9:
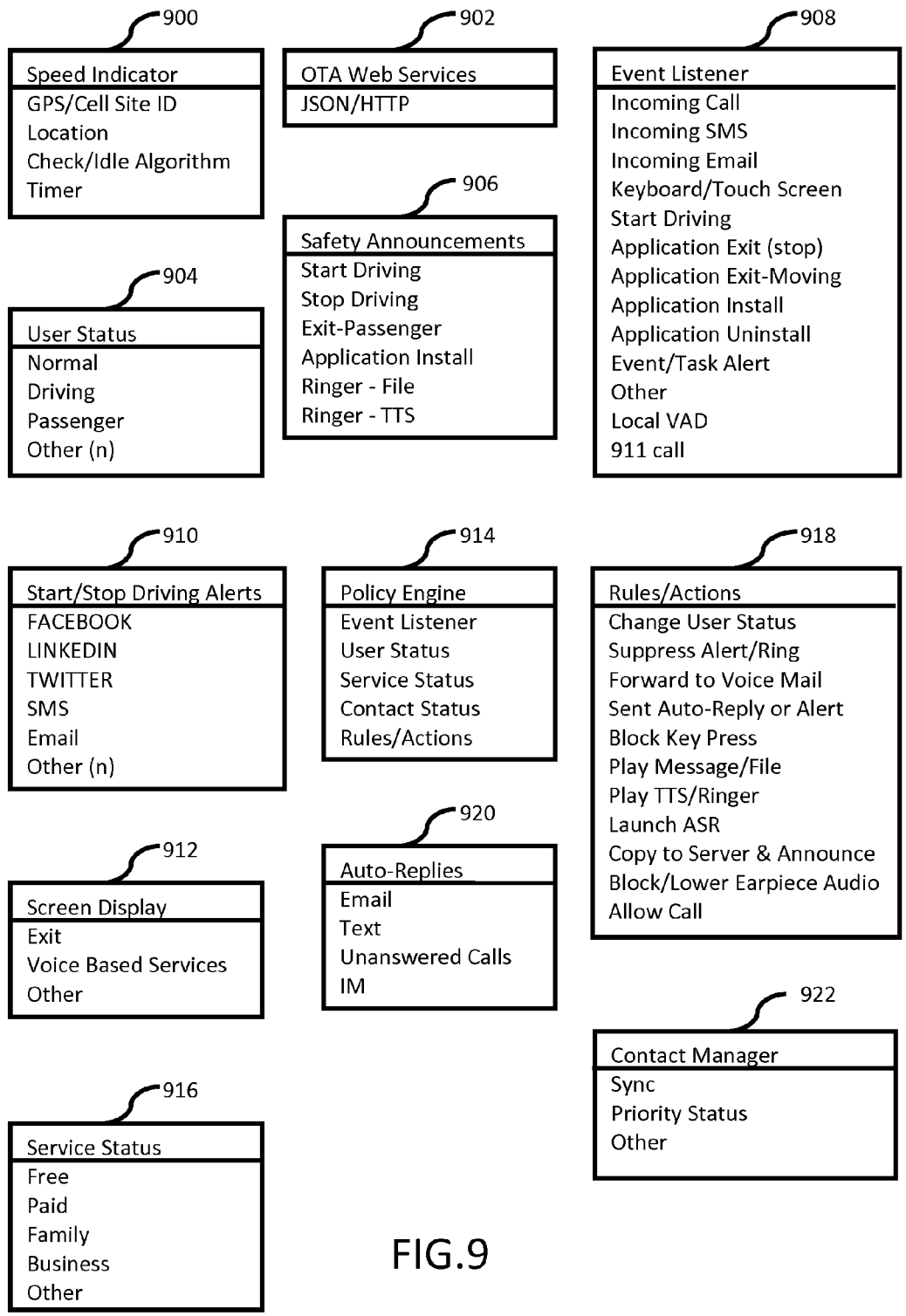
FIG. 9 is a client architecture in accordance with an embodiment.

FIG. 9 shows the main components in an embodiment of the client architecture. The client architecture consists of speed indicator 900, over-the-air programming (OTA) web services 902, user status 904, safety announcements 906, event listener 908, start/stop driving alerts 910, screen display 912, policy engine 914, service status 916, rules/actions 918, auto-replies 920, and contact manager 922. The client architecture shows a set of modules which can implement all of the functionality related to safe driving mode. Each component can be implemented as a class in an object-oriented programming language. Alternatively, one or more classes can cover the implementation of a single component.

The speed indicator 900 is concerned with implementation of all speed detection aspects. The speed indicator 900 can implement functions related to speed computation, obtaining GPS information, and the battery saving techniques, among others. Over-the-air web services 902 consists of the functionality allowing for the system, policies, settings, and updates to be distributed to the portable electronic device via HTTP or via Javascript Object Notation (JSON). The user status 904 is concerned with tracking the state of the portable electronic device, which may be normal (not driving), driving, passenger, or other. Passenger mode includes manually disabling safe driving mode or the use of the snooze feature. Safety announcements 906 is concerned with the implementation of audio announcements played to the user in response to one or more events, such as when the user starts to drive or when the user stops driving. A safety announcement may consist of an audio file, played to the user, or it may consist of a text file, which is converted to audio using a text-to-speech (US) system.

The event listener 908 handles all events related to the portable electronic device. The event listener 908 can associate events of interest with corresponding event handlers. For example, the event listener 908 can detect the event associated with an incoming call. Once an incoming call is received, the event listener 908 informs the corresponding event handler, which then assumes the responsibility of performing the necessary actions in response to the event. Driving alerts 910 provides a wrapper to various user accounts, enabling driving alerts and status updates to be sent to the corresponding user accounts. For example, these accounts may include FACEBOOK, LINKEDIN, TWITTER, SMS, instant messaging, and email. Screen display 912 consists of functionality used to control the locking of the display screen when engaged in safe mode. Screen display 912 also may consist of implementation of a safe driving screen allowing limited but easy access through the use of custom keys, soft keys, and voice services.

The policy engine 914 integrates several modules to manage the modification of the behavior of the portable electronic device according to one or more safety policies. The policy engine 914 uses the event listener 908 to detect events. The user status 904 provides the policy engine 914 with the status of the portable electronic device. Based on the status, the policy engine queries the service status 916 to determine the degree of functionality that can be provided to the user. The contact status allows the policy engine to determine whether the other party is a priority contact. All of these factors are used to take the appropriate action using the rules/actions 918 module. The actions taken, as previously described, can range from suppressing an alert associated with the event to allowing the call via voice services. If one of the actions is to send an auto-reply to the other party, then the auto-replies 920 module handles such processing by responding with an appropriate message via email, SMS, instant message, or other. The contact manager 922 manages the user's contacts, allowing other modules to query whether a calling party is a priority contact, part of a group, etc.

While the present invention has been illustrated and described herein in terms of several embodiments and alternatives, it is to be understood that the techniques described herein can have a multitude of additional uses and applications. Accordingly, the invention should not be limited to just the particular description and various drawing figures contained in this specification that merely illustrate a preferred embodiment and application of the principles of the invention.

What is claimed is:

1. A method of minimizing a plurality of motion requests made by a motion detector to determine a motion of a portable electronic device, comprising the steps of:
   receiving a first event from a plurality of events generated by one or more functions of the portable electronic device;
   setting a baseline interval equal to a first interval in response to the first event, the first interval based on a type of the first event, and wherein the baseline interval specifies an amount of time between a first motion request and a second motion request among the plurality of motion requests;
   setting a running time of the baseline interval equal to a first running time, the first running time based on the type of the first event; and
   setting the baseline interval equal to a default interval and the running time equal to a default running time if no further events are received at the end of the running time of the first event.

2. The method as recited in claim 1, further comprising the steps of:
   receiving a second event from the plurality of events;
   setting the baseline interval equal to a second interval in response to the second event, the second interval based on a type of the second event; and
   setting the running time equal to a second running time, the second running time based on the type of the second event.

3. The method as recited in claim 1, wherein the plurality of events includes detecting the presence of a charger, using a voice communication function, using a text messaging function, using an email function, turning on the portable electronic device, restarting the portable electronic device, receiving a location update via an external signal, receiving an alert from a third-party application, using the third-party application, detecting a hands-free device, and a calendar event.

4. The method as recited in claim 1, further comprising the step of receiving a policy from a consumer of the portable electronic device, the policy indicating a consumer preference relating to the plurality of events, the baseline interval, and the running time.

5. The method as recited in claim 1, further comprising the step of storing a set of usage patterns performed by a consumer of the portable electronic device on a storage system associated with the portable electronic device, the usage patterns related to the one or more functions used by the consumer.

6. The method as recited in claim 5, wherein the step of storing further comprises the steps of:
   storing an event entry associated with the first event in the set of usage patterns; and
   analyzing the set of usage patterns to update the first interval and the first running time.

7. The method as recited in claim 6, wherein the step of analyzing uses a machine learning algorithm to analyze the set of usage patterns.

8. The method as recited in claim 5, wherein the set of usage patterns includes a plurality of entries in a file, wherein each entry from the plurality of entries includes an event name associated with a received event from the plurality of events, a time and a day associated with the received event, and a duration of the received event.

9. The method as recited in claim 5, wherein the storage system is located within the portable electronic device.

10. The method as recited in claim 5, wherein the storage system is located remotely from the portable electronic device.

11. The method as recited in claim 1, wherein the baseline interval and the running time are set according to a remaining battery life of the portable electronic device.

* * * * *

UNITED STATES PATENT AND TRADEMARK OFFICE
CERTIFICATE OF CORRECTION

| | | |
|---|---|---|
| PATENT NO. | : 8,270,933 B2 | Page 1 of 1 |
| APPLICATION NO. | : 12/755377 | |
| DATED | : September 18, 2012 | |
| INVENTOR(S) | : Michael S. Riemer | |

It is certified that error appears in the above-identified patent and that said Letters Patent is hereby corrected as shown below:

Title Page,
Item (63) Related U.S. Application Data:
Delete "Continuation-in-part of application No. 12/394,413, filed on Feb. 27, 2009, and a continuation of application No. 11/285,556, filed on Nov. 22, 2005, now Pat. No. 7,505,784." and insert
-- Continuation-in-part of application No. 12/394,413, filed on Feb. 27, 2009, which is a continuation of application No. 11/285,556, filed on Nov. 22, 2005, now Pat. No. 7,505,784. --.

Signed and Sealed this
Eleventh Day of December, 2012

David J. Kappos
*Director of the United States Patent and Trademark Office*